United States Patent
Nguyen et al.

(10) Patent No.: US 11,688,107 B2
(45) Date of Patent: Jun. 27, 2023

(54) SYSTEMS AND METHODS FOR MODIFYING CONTEXT-BASED DATA PROVIDED FOR AN INDUSTRIAL AUTOMATION SYSTEM

(71) Applicant: Rockwell Automation Technologies, Inc., Mayfield Heights, OH (US)

(72) Inventors: Thong T. Nguyen, New Berlin, WI (US); Paul D. Schmirler, Glendale, WI (US); Timothy T. Duffy, Franklin, WI (US); Kristopher J. Holley, Mequon, WI (US); Susan J. Lovas, Sussex, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/482,145

(22) Filed: Sep. 22, 2021

(65) Prior Publication Data

US 2023/0091778 A1    Mar. 23, 2023

(51) Int. Cl.
  *G06T 11/00*    (2006.01)
  *G06F 3/01*    (2006.01)
  (Continued)

(52) U.S. Cl.
  CPC .............. *G06T 11/00* (2013.01); *G06F 3/011* (2013.01); *G06N 5/022* (2013.01); *G06N 5/04* (2013.01)

(58) Field of Classification Search
  None
  See application file for complete search history.

(56) References Cited

U.S. PATENT DOCUMENTS 10,067,737 B1    9/2018 Ozery
2016/0341961 A1    11/2016 Mullins et al.
(Continued)

OTHER PUBLICATIONS

"Saving Our Workforce: Mobile Robot Takes on Dangerous Tasks," New Equipment Digest, Jul. 19, 2021, 4 pages, https://www.newequipment.com/product-news/article/21169937/sarcos-robotics-sarcos-robotics-successfully-implements-nextgeneration-teleoperation-capabilities-of-guardian-xt-robotic-system/, last accessed Sep. 22, 2021.

(Continued)

*Primary Examiner* — Yu Chen
(74) *Attorney, Agent, or Firm* — Fletcher Yoder, P.C.

(57) ABSTRACT

A tangible, non-transitory, computer-readable medium includes instructions that, when executed by processing circuitry, are configured to cause the processing circuitry to receive sensory datasets associated with an industrial automation system, determine context information based on a sensory dataset and representative of an environmental condition, predict an intent of a user to complete a task associated with the industrial automation system based on the sensory datasets and the context information, present first output representative data via an extended reality device based on the intent and a setting, the setting including a data presentation format for presenting the sensory datasets, receive inputs indicative of changes to the data presentation format, present second output representative data via the extended reality device in response to receiving the inputs, and update the setting based on the inputs and historical data indicative of users changing the data presentation format of the first output representative data.

20 Claims, 13 Drawing Sheets

(51) Int. Cl.
  *G06N 5/022* (2023.01)
  *G06N 5/04* (2023.01)

(56) References Cited

U.S. PATENT DOCUMENTS

| | | | | |
|---|---|---|---|---|
| 2017/0195265 | A1* | 7/2017 | Billi | H04L 51/046 |
| 2019/0018394 | A1* | 1/2019 | Sayyarrodsari | G06Q 50/04 |
| 2019/0354334 | A1* | 11/2019 | Billinghurst | G06F 3/013 |
| 2021/0064937 | A1* | 3/2021 | Nguyen | G06V 30/387 |
| 2021/0216773 | A1* | 7/2021 | Bohannon | G06V 20/20 |
| 2021/0235171 | A1* | 7/2021 | Abel | E21B 33/13 |
| 2021/0263168 | A1 | 8/2021 | Nguyen et al. | |
| 2022/0164024 | A1* | 5/2022 | Palazzo | A63F 13/00 |
| 2022/0187964 | A1* | 6/2022 | Jensen | G06Q 20/38 |
| 2022/0270509 | A1* | 8/2022 | Josephson | G06F 3/0346 |

OTHER PUBLICATIONS

Nguyen, Thong, "Can Virtual Reality Change Your Mind?," TEDx Minneapolis, Nov. 21, 2018, 15:59 minutes, 2 pages, https://tedxminneapolis.com/thong-nguyen/, last accessed Sep. 22, 2021.
Smartereveryday, "A Real Life Haptic Glove (Ready Player One Technology Today)—Smarter Every Day 190," YouTube, Mar. 1, 2018, 11:04 minutes, 3 pages, https://www.youtube.com/watch?v=OK2y4Z5lkZ0/, last accessed Sep. 22, 2021.
Eagleman, David, "Can we create a new sense of humans?" TED2015, Mar. 2015, 20:26 minutes, 1 page, https://www.ted.com/talks/david_eagleman_can_we_create_new_senses_for_humans?language=en#t-761170/, last accessed Sep. 22, 2021.
Djavit, Nuri, "TEDTalks—Tan Le: A headset that reads your brainwaves," Emotiv, Jul. 13, 2010, 10:38 minutes, 2 pages, https://www.emotiv.com/news/tedtalks-tan-le-a-headset-that-reads-your-brainwaves/, last accessed Sep. 22, 2021.
Redrock Biometrics Inc, "Epson and Redrock Biometrics Bring First Biometric Authentication Solution to Consumer Augmented Reality Headsets," Businesswire, May 8, 2018, 2 pages, https://www.businesswire.com/news/home/20180508005612/en/Epson-and-Redrock-Biometrics-Bring-First-Biometric-Authentication-Solution-to-Consumer-Augmented-Reality-Headsets/, last accessed Sep. 22, 2021.
"The Team Behind EXO Insights," EXO Insights, 2020, 4 pages, https://www.exoinsights.com/about/, last accessed Sep. 22, 2021.
Diamandis, Peter, "How Augmented Reality Will Overhaul Our Most Crucial Industries," SingularityHub, Sep. 27, 2019, 10 pages, https://singularityhub.com/2019/09/27/how-augmented-reality-will-overhaul-our-most-crucial-industries/, last accessed Sep. 22, 2021.
Datcu, Dragos et al., "Using augmented reality for supporting information exchange in teams from the security domain," Security Informatics (2015) 4:10, Dec. 10, 2015, 18 pages, https://www.researchgate.net/publication/286487311_Using_augmented_reality_for_supporting_information_exchange_in_teams_from_the_security_domain/, last accessed Sep. 22, 2021.
Gallace, Alberto et al.,"Multisensory presence in virtual reality: Possibilities and limitations," Sep. 29, 2020, 38 pages, EBSCO Publishing, University of Alabama at Birmingham.
Ranasinghe, Nimesha at al., "Season Traveller: Multisensory Narration for Enhancing the Virtual Reality Experience," the 2018 CHI Conference, Apr. 2018, 14 Pages, https://www.researchgate.net/publication/324663404_Season_Traveller_Multisensory_Narration_for_Enhancing_the_Virtual_Reality_Experience/, last accessed Sep. 22, 2021.
Wei, Jun, et al. "CoDine: An Interactive Multi-sensory System for Remote Dining," UbiComp '11, Sep. 17, 2011, 10 Pages, Beijing, China, https://www.academia.edu/1953347/CoDine_an_interactive_multi_sensory_system_for_remote_dining/ Beijing, China, last accessed Sep. 22, 2021.
European Extended Search Report for EP Application No. 22196583.3 dated Feb. 9, 2023; 9 pgs.

\* cited by examiner

SYSTEMS AND METHODS FOR MODIFYING CONTEXT-BASED DATA PROVIDED FOR AN INDUSTRIAL AUTOMATION SYSTEM

BACKGROUND

The disclosure relates generally to providing data to a user performing a task associated with an industrial environment. More specifically, embodiments of the present disclosure are related to systems and methods for receiving sensory datasets associated with an industrial automation system, determining context information, and presenting output representative data associated with the sensory datasets in a manner or format based on the context information.

This section is intended to introduce the reader to various aspects of art that may be related to various aspects of the present techniques and are described and/or claimed below. This discussion is believed to be helpful in providing the reader with background information to facilitate a better understanding of the various aspects of the present disclosure. Accordingly, it should be noted that these statements are to be read in this light, and not as admissions of prior art.

Various types of data may be used to assist a user to perform a certain task. As an example, the user may determine an appropriate action to be performed based on the data, and/or the data may otherwise guide the user to perform the task. For instance, the data may provide instructions to perform an action on a component or device of an industrial automation system. In some embodiments, the data may be presented using real-world elements and/or computer-generated or virtual elements, including visual elements, audio elements, haptic elements, and the like. Unfortunately, an amount of data presented to the user and/or the manner in which the data is presented to the user may not effectively or efficiently assist the user with performing the task. Thus, there is a need to improve how data may be presented to the user.

BRIEF DESCRIPTION

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a tangible, non-transitory, computer-readable medium includes instructions that, when executed by processing circuitry, are configured to cause the processing circuitry to receive sensory datasets associated with an industrial automation system, determine context information based on a sensory dataset and representative of an environmental condition, predict an intent of a user to complete a task associated with the industrial automation system based on the sensory datasets and the context information, present first output representative data via an extended reality device based on the intent and a setting, the setting including a data presentation format for presenting the sensory datasets, receive inputs indicative of changes to the data presentation format, present second output representative data via the extended reality device in response to receiving the inputs, and update the setting based on the inputs and historical data indicative of users changing the data presentation format of the first output representative data.

In one embodiment, a method includes receiving, via a processor, a plurality of sensory datasets associated with an industrial automation system from a plurality of sensors, the plurality of sensors having an image sensor, a microphone, a haptic sensor, a movement sensor, a biometric sensor, an odor sensor, or any combination thereof, identifying, via the processor, context information based on at least one sensory dataset of the plurality of sensory datasets, the context information being representative of an environmental condition surrounding the industrial automation system, determining, via the processor, a task to be performed by a user for the industrial automation system based on the context information and the plurality of sensory datasets, presenting, via the processor, output representative data via a first extended reality device based on the plurality of sensory datasets and the context information, and receiving, via the processor, audio feedback, image feedback, or both, via a second extended reality device communicatively coupled to the processor during presentation of the output representative data. The method also includes presenting, via the processor, audio data, image data, or both corresponding to the audio feedback, the image feedback, or both via the first extended reality device, storing, via the processor, the plurality of sensory datasets, the output representative data, the audio data, the image data, or any combination thereof, as training content for performing the task, receiving, via the processor, an indication to retrieve the training content via a third extended reality device, retrieving, via the processor, the training content in response to receiving the indication; and presenting the plurality of sensory datasets, the output representative data, the audio data, the image data, or any combination thereof, via the third extended reality device in response to retrieving the training content.

In one embodiment, a processing system of an industrial automation system includes processing circuitry and a memory storing instructions that, when executed by the processing circuitry, are configured to cause the processing circuitry to receive a plurality of sensory datasets associated with the industrial automation system from a plurality of sensors, the plurality of sensory datasets including audio data, vibration data, operating speed data, temperature data, or any combination thereof, determine an action associated with a maintenance operation to be performed by a user in response to a first sensory dataset being outside of a first range of values and a second sensory dataset being outside of a second range of values, receive context information via an extended reality device, the context information being representative of an environmental condition associated with the extended reality device, determine a data presentation format for presenting at least a portion of the plurality of sensory datasets based on the action and the context information, and present output representative data according to the data presentation format via the extended reality device.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
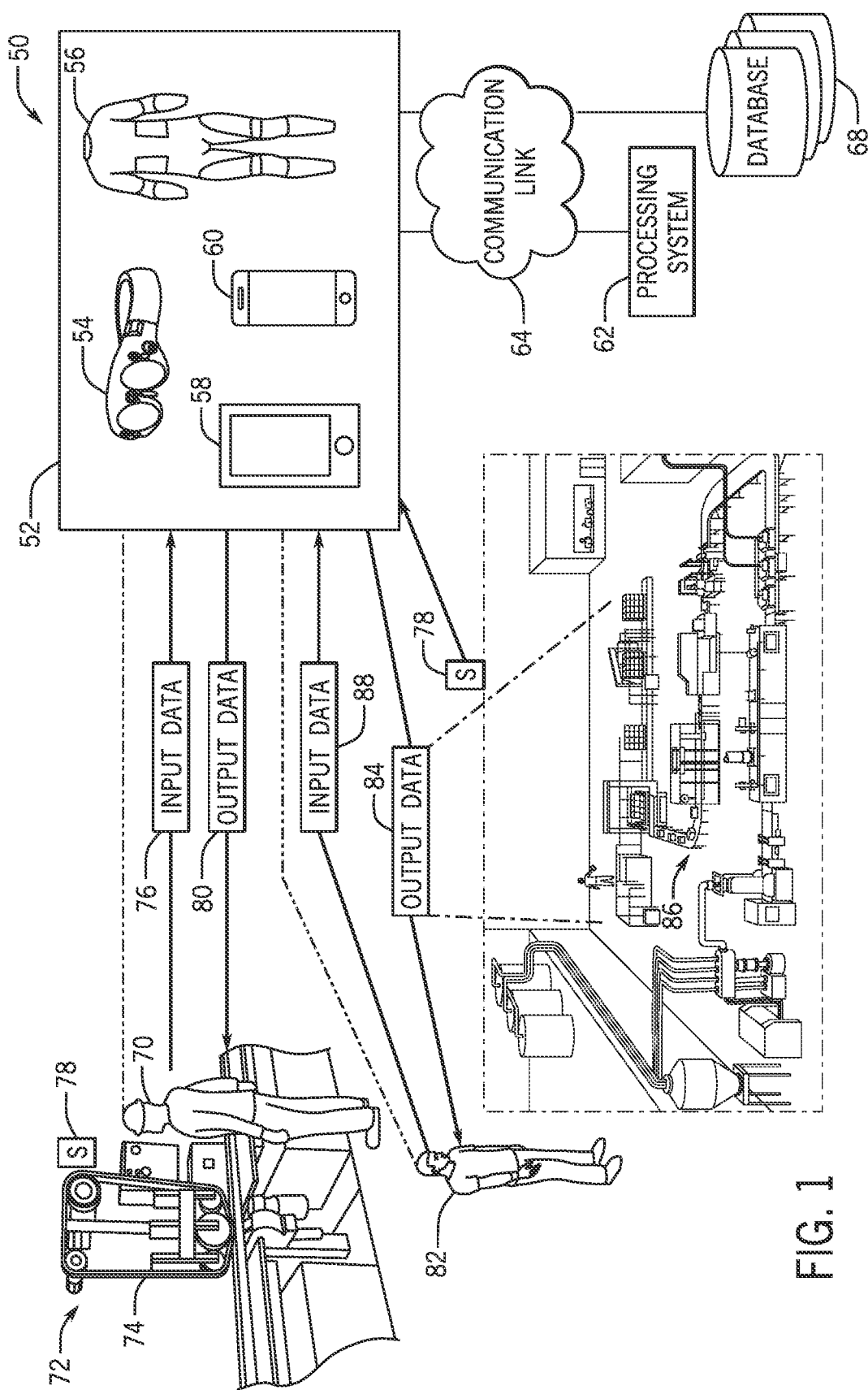
FIG. 1 is a schematic diagram of a communication network to provide a user with data associated with an industrial automation system, in accordance with an embodiment of the present disclosure.

One or more specific embodiments of the present disclosure will be described below. In an effort to provide a concise description of these embodiments, all features of an actual implementation may not be described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

The present disclosure is generally directed to a system and method for presenting data to a user to assist the user to perform a desired task. For example, the user may desire to perform a task in an industrial environment (e.g., an industrial automation system), such as to install an industrial component, to perform maintenance on an industrial component, to adjust an operation of an industrial component, to inspect an industrial component, to replace an industrial component, and the like. The user may utilize a device (e.g., a mobile device, a wearable device) to present data that helps with performing the desired task. In some embodiments, the device may include an extended reality device that may present real-world elements and/or virtual elements. For example, the device may use virtual reality, which primarily includes a virtual or computer-generated environment, augmented reality, which may present virtual or computer-generated elements to alter a physical world from perceived senses (e.g., by overlaying virtual elements on top of a real-world surrounding), mixed reality, which combines real-world surroundings with virtual elements that may interact with the real-world surroundings, and/or other extended reality features. By presenting virtual elements in addition to real-world elements, the device may better guide the user to perform the desired task.

Unfortunately, it may be difficult to present data in a manner that effectively enables the user to perform the desired task. As an example, there may not be an appropriate amount of data being presented. For instance, presenting too much data may overwhelm the user, while not presenting enough data may hinder the user from completing the desired task. Additionally, the manner or format in which the data is presented may not effectively assist the user to perform the desired task. For example, presenting an excess amount of visual data may obstruct a view of the user and reduce the user's ability to perform a particular task for which increased vision may be important. Further still, the presented data may not be relevant to the user (e.g., may not be needed to complete the desired task). Therefore, the presented data may not be beneficial to the user.

Accordingly, it is now recognized that there is a need to improve the presentation of data to the user to facilitate the user performing the desired task. Thus, embodiments of the present disclosure are directed to a system and method to present data based on context information, which may include different environmental conditions that may be associated with the user, the desired task, the device presenting the data, and so forth. In some embodiments, processing circuitry, such as processing circuitry of the device or separate from the device, may receive various input data, such as visual data, audio data, haptic data, and/or olfactory data associated with an environment, location data associated with the device, biometric data associated with the user, other suitable data, or any combination thereof. The processing circuitry may also determine relevant context information. Based on the context information, the processing circuitry may determine a priority and/or an importance of the input data. The processing circuitry may then determine a suitable manner in which output data representative of the input data may be presented based on the priority. As a result, the processing circuitry may cause the device to present the output data to the user in the suitable manner. Indeed, the processing circuitry may receive input data in a first format and present output data representative of such input data in a second format. As an example, the processing circuitry may cause the device to present an input haptic data (e.g., a temperature) via output visual data (e.g., textual indication of the temperature) based on the context information. As another example, the processing circuitry may block the device from presenting certain output data, such as output data representative of input data that is determined to be irrelevant to the user. Thus, the processing circuitry may cause the device to present or demonstrate the data in a way (e.g. an intuitive manner) that improves guidance to perform the desired task, thereby increasing a quality and/or an efficiency of task performance.

Although the present disclosure primarily discusses usage of an extended reality device to present data to a user, any suitable device may be used to present the data. Further, for purposes of discussion, the present disclosure is primarily described with reference to performing a task associated with an industrial environment. However, the techniques described herein may be implemented in any suitable environment, setting, or application.

With the preceding in mind, FIG. 1 is an embodiment of a communication network 50 for processing and presenting data to a user. The communication network 50 may include one or more of an extended reality device 52, which may present data to the user via real-world elements and/or virtual elements. For example, the extended reality device 52 may use virtual reality, augmented reality, and/or mixed reality techniques. In some embodiments, the extended reality device 52 may include a mobile or wearable device to enable the user to move the extended reality device 52 more easily. For instance, the extended reality device 52 may include a headset 54 (e.g., a virtual reality headset, an augmented reality headset), a wearable device 56 (e.g., a body suit, gloves), a tablet 58, a phone 60, another suitable device, or any combination thereof. In the illustrated embodiment, the communication network 50 includes a processing system 62 (e.g., a physical server, a cloud computing system) is communicatively coupled to the extended reality device 52 via a communication link 64 that may permit data exchange between components of the communication network 50. For instance, the communication link 64 may include any wired or wireless network that may be implemented as a local area network (LAN), a wide area network (WAN), and the like. The communication link 64 may receive certain data, such as sensor data, transmitted by the extended reality device 52, and the communication link 64 may transmit such data to the processing system 62.

The processing system 62 may then process the data received from the extended reality device 52 via the communication link 64. As an example, the processing system 62 may control various operations of the extended reality device 52 based on the received data. For instance, as further described herein, the processing system 62 may instruct the extended reality device 52 to present certain data in response. In additionally embodiments, the processing system 62 may provide data to be presented by the extended reality device 52. For instance, the processing system 62 may provide image data, audio data, haptic feedback, and the like, to the extended reality device 52, and the extended reality device 52 may control the presentation of such data received from the processing system 62 without additional instructions from the processing system 62. Although the processing system 62 is separate from the extended reality device 52 in the illustrated communication network 50, the processing system 62 may be a part of the extended reality device 52 in other embodiments of the communication network 50. In this way, the extended reality device 52 may process received data without transmitting the received data to another component (e.g., via the communication link 64) for processing.

Furthermore, the communication network 50 may include a database 68, which may be communicatively coupled to the processing system 62 and/or to the extended reality device 52 via the communication link 64. As an example, the database 68 may store certain information and/or content, and the extended reality device 52 and/or the processing system 62 may retrieve such information and/or content from the database 68 (e.g., to present to the user). As another example, the extended reality device 52 and/or the processing system 62 may transmit data to the database 68 for storage and enable such data to be retrieved at a later time.

In some embodiments, the communication network 50 may assist a local user 70 who may be physically located in an industrial automation system 72. For example, the local user 70 may be an operator and/or a technician who is interacting with an industrial automation component 74 of the industrial automation system 72, such as to install, inspect, monitor, study, repair, perform maintenance on, adjust an operation of, and/or to replace the industrial automation component 74. The industrial automation component 74 may include a variety of different components, such as a controller, a drive, a motor, a sensor, a conveyor, an input/output (I/O) module, a motor control center, a human machine interface (HMI), a user interface, contactors, a starter, a relay, a protection device, a switchgear, a compressor, a network switch (e.g., an Ethernet switch), a scanner, a gauge, a valve, a flow meter, and so forth. The local user 70 may utilize the extended reality device 52 to perform an action within the industrial automation system 72. For instance, the local user 70 may wear or otherwise possess the extended reality device 52 to present data that helps the local user 70 perform various tasks.

By way of example, the extended reality device 52 may receive (e.g., collect) first input data 76 associated with the industrial automation system 72. In certain embodiments, the first input data 76 may include sensory datasets. As described herein, sensory datasets may include any information that may be observed by a person (e.g., the local user 70) and that is converted into a digital format. For instance, the sensory datasets may include visual data, audio data, haptic data, biometric data, gustatory data, and/or olfactory data. Visual data may include an appearance, a position, an orientation, and/or a movement of various entities, such as of the local user 70, the industrial automation component 74, and/or the industrial automation system 72. Such visual data may indicate an identity of local user 70, a location (e.g., position, orientation) of the local user 70 (e.g., within the industrial automation system 72, relative to the industrial automation component 74), a layout of the industrial automation system 72, an identity of the industrial automation component 74, an operation of the industrial automation component 74, a location (e.g., position, orientation) of the industrial automation component 74, and the like. Audio data may include sounds emitted from the local user 70, the industrial automation system 72, and/or the industrial automation component 74 and may indicate an activity performed by the local user 70, a location of the local user 70, an operating status of the industrial automation system 72 and/or the industrial automation component 74, and the like. Haptic data may include information that may be perceived by touch, such as a temperature of the industrial automation system 72 and/or of the industrial automation component 74, a structure (e.g., a rigidity, a strength, a material) of the industrial automation component 74, and the like. Biometric data may include heartbeat data, temperature data, retina reading, facial data (e.g., facial expression data), fingerprint data, brainwave data of the local user 70, and the like. Such data may indicate a status of the local user 70, the industrial automation component 74, and/or the industrial automation system 72. Gustatory data may include tastes or flavors present in the industrial automation system 72, such as a taste experienced by a user of the extended reality device 52. Olfactory data may include smells, such as smells in the industrial automation system 72, and may further indicate a status of the local user 70, of the industrial automation system 72, and/or of the industrial automation component 74.

The extended reality device 52 and/or processing system 62 may include and/or may be communicatively coupled to one or more sensors 78 (e.g., a physical sensor, a virtual sensor) that may detect various operating parameters. The sensor(s) 78 may transmit the first input data 76 indicative of the operating parameters to the extended reality device 52. As an example, the sensor(s) 78 may include an image sensor (e.g., a digital camera, a thermal camera, an infrared camera, an x-ray sensor, a ranging sensor, electromagnetic radiation (or light) sensors such as a visual light sensor, an infrared sensor, an ultraviolet sensor, an ultrasound imaging system or sensor, a thermal sensor, a laser sensor, a Light Detection and Ranging (LiDAR) sensor), a microphone, a haptic sensor (e.g., a thermal sensor, a pressure sensor), a movement sensor (e.g., an accelerometer), a biometric sensor (e.g., a brain wave sensor, a heart rate monitor, a respiratory rate sensor, a blood pressure monitor), a gustatory sensor (e.g., an electronic tongue), a smell or odor sensor (e.g., an electronic nose), another suitable sensor, or any combination thereof. The sensor(s) 78 may also be included on one or more devices worn by a user (e.g., the local user 70) that are communicatively coupled to the extended reality device 52 and/or the processing system 62, and the devices may be different than the extended reality device 52. In other words, the sensor(s) 78 may be included in a device that does not provide an extended reality experience to the local user 70 in itself. For example, the sensor(s) 78 may be included in a fitness tracker or a smart watch that provides the first input data 76 or a portion of the first input data 76 to the extended reality device 52 and/or the processing system 62. Indeed, the sensor(s) 78 may be included on devices worn by or used by the local user 70.

Furthermore, it should be noted that, in some embodiments, the sensor(s) 78 may be communicatively coupled to the processing system 62 without being communicatively coupled to the extended reality device 52. According, in such embodiments, the first input data 76 collected by the sensor(s) 78 may be provided directly to the processing system 62.

Additionally, the first input data 76 may include a user input. In an example, the user input may directly indicate sensory datasets, such as an identifier of the local user 70, a location of the local user 70, information associated with the industrial automation component 74, and the like. In some embodiments, the user may interact with a feature of the extended reality device 52 to transmit the user input. Additionally, the user may interact with a feature of another component (e.g., of the industrial automation component 74) to cause the user input to be transmitted to the extended reality device 52.

The processing system 62 may receive the first input data 76 transmitted to the extended reality device 52 and process the first input data 76. For instance, the processing system 62 may determine first output data 80 to be transmitted or output based on the first input data 76. As an example, the processing system 62 may determine first output data 80 that is relevant or important to enable and/or assist the local user 70 to perform a task. To this end, the processing system 62 may determine context information associated with the first input data 76 to prioritize the first input data 76 and determine the suitable first output data 80. The context information may include environmental conditions associated with the local user 70 and/or the industrial automation system 72. In certain embodiments, the processing system 62 may associate received first input data 76 with respective categories, and the processing system 62 may determine a priority of the categories based on the context information. For example, the processing system 62 may query or retrieve a list, such as a list created by an end user, a manufacturer, and the like, the list defining different possible priorities of the categories corresponding to different context information. The processing system 62 may then determine corresponding first output data 80 based on the priority.

The first output data 80 may be presented in a different format than the format of the corresponding first input data 76. In an example, the first input data 76 may include image data of the industrial automation component 74. However, the processing system 62 may determine that first output data 80 corresponding to the image data of the industrial automation component 74 may include audio data associated with industrial automation component 74, such as an instruction, an identifier, a manufacturer, and/or a specification associated with the industrial automation component 74. Accordingly, in this example, audio data of the first output data 80 may be generated based on received visual data of the first input data 76. In response to determining the first output data 80 to be presented, the processing system 62 may cause the extended reality device 52 to present the first output data 80 to help the local user 70 perform the task. In some embodiments, the first output data 80 may include instructions (e.g., textual instructions, audio instructions) that may guide the local user 70, certain sensory datasets that may not be easily detectable by the local user 70, and/or information that may cause the local user 70 to focus on a certain aspect of the industrial automation component 74. Indeed, the processing system 62 may present the first output data 80 in an intuitive manner to better help the user by selecting the information included in the first output data 80, the format(s) in which the first output data 80 is presented, and/or the position (e.g., spatial position relative to the local user 70) in which the first output data 80 is presented. For example, the processing system 62 may guide the user to a target location (e.g., toward the industrial automation component 74, toward an alarm or a sound, away from a certain area within the industrial automation system 72) by determining the target location relative to the current location and/or orientation of the user and presenting audio data (e.g., spoken instructions, a beacon sound) and/or haptic feedback in a spatial position based on the target location relative to the current location and/or orientation of the user in order to enable the local user 70 to navigate to the target location more easily (e.g., by orienting the local user 70 toward the target location).

In additional embodiments, the communication network 50 may assist a remote user 82 who may be remotely located relative to the industrial automation system 72. For example, the remote user 82 may utilize the extended reality device 52 to remotely inspect the industrial automation system 72, such as to determine a current status of the industrial automation component 74. Therefore, the remote user 82 may complete various actions with respect to the industrial automation system 72 without having to be physically present within the industrial automation system 72, thereby reducing a cost (e.g., transportation costs, equipment costs), a time expenditure (e.g., time of transportation or movement), and/or a complexity (e.g., coordinating schedules for component operations or system operations) associated with performing the actions. In such embodiments, the context information may include an environmental condition associated with the remote user 82. In further embodiments, the remote user 82 may include any suitable user, such as user who is at a first location in the industrial automation system 72 separate from a second location of the local user 70. For instance, the local user 70 and the remote user 82 may be adjacent to different industrial automation components 74 that are located in different areas of the industrial automation system 72. As an example, the remote user 82 may be greater than a threshold distance away from the local user 70, an industrial automation component 74, the industrial automation system 72, and so forth. Thus, the remote user 82 may not experience certain aspects experienced by the local user 70 without use of the communication network 50.

The processing system 62 may therefore receive the first input data 76, which may include various sensory datasets associated with the industrial automation system 72, and the processing system 62 may cause the extended reality device 52 to present corresponding second output data 84 to the remote user 82 based on the first input data 76. By way of example, since the remote user 82 may not be able to physically view the industrial automation system 72, the processing system 62 may prioritize presenting image data 86 (e.g., a virtual image representative of the industrial automation system 72) to the remote user 82. Indeed, the processing system 62 may cause the extended reality device 52 to present second output data 84 that may simulate the environment of the industrial automation system 72, such as appearances, machinery sounds, and/or a temperature associated with the industrial automation system 72, to immerse the remote user 82 in the industrial automation system 72. Such immersion may better enable the remote user 82 to perform a task associated with the industrial automation system 72. As such, the second output data 84 presented to the remote user 82 may be different from the first output data 80 presented to the local user 70, even though the same first input data 76 may have been initially received. Additionally, the second output data 84 may include similar data as the first output data 80 and therefore may provide similar information to the remote user 82 as that provided to the local user 70. Thus, the remote user 82 may have access to similar information to which the local user 70 may have access and better immerse the remote user 82 in the industrial automation system 72.

The processing system 62 may also receive second input data 88, which may be separate from the first input data 76 associated with the industrial automation system 72. The processing system 62 may cause the extended reality device 52 to present the second output data 84 based on the second input data 88. As an example, the second input data 88 may include sensory datasets associated with a remote environment in which the remote user 82 is located. For instance, the second input data 88 may include audio data indicative that a certain area of the remote environment (e.g., relative to the remote user 82) is loud. As a result, the processing system 62 may cause the extended reality device 52 to avoid presenting the second output data 84 in the form of audio data. Additionally, the second input data 88 may include a user input, such as from the remote user 82. The user input may indicate the context information that the processing system 62 may use to determine the corresponding second output data 84 to be presented. Therefore, the processing system 62 may use both the first input data 76 and the second input data 88 to determine suitable second output data 84 to be presented.

Moreover, the remote user 82 may utilize the extended reality device 52 to provide guidance to the local user 70 performing a task associated with the industrial automation system 72. For this reason, the first input data 76 may include information associated with the local user 70, and the second output data 84 presented to the remote user 82 may be based on such information. As an example, the remote user 82 may be placed in communication with the local user 70 (e.g., based on an indication provided by the local user 70 and indicative of the local user 70 needing assistance) to assist the local user 70 with performing the task, and the processing system 62 may cause the extended reality device 52 of the remote user 82 to present the second output data 84 to better enable the remote user 82 to assist the local user 70. Indeed, the second output data 84 may include information regarding the local user 70 (e.g., visual data of the local user 70 and/or of the viewing perspective of the local user 70, audio output from the local user 70, biometric data of the local user 70) to enable the remote user 82 to provide assistance (e.g., instructions) that may be more personalized or tailored to the local user 70. Furthermore, by providing the remote user 82 with the second output data 84 that immerses the remote user 82, the processing system 62 may enable the local user 70 to provide assistance that is more relevant to the situation of the local user 70. The remote user 82 may therefore provide better guidance without having to be physically located at the industrial automation system 72, thereby reducing a cost and/or a time associated with assisting the local user 70.

In such embodiments, both the local user 70 and the remote user 82 may utilize respective extended reality devices 52 to perform a task. Thus, the processing system 62 may cause the extended reality device 52 of the local user 70 to present the first output data 80 to the local user 70 and cause the extended reality device 52 of the remote user 82 to present the second output data 84 to the remote user 82. The local user 70 and the remote user 82 may therefore utilize the respective output data 80, 84 to interact with one another and better perform the task.

Further, in certain embodiments, the processing system 62 may cause the extended reality device 52 used by the remote user 82 to present second output data 84 that is more closely associated with the local user 70. For example, a location of the local user 70 (e.g., within the industrial automation system 72) may be determined, and the processing system 62 may receive first input data 76 that may specifically be monitored within a threshold distance of the location. As the local user 70 moves and changes location, the processing system 62 may receive updated first input data 76 associated with a new location of the local user 70. In this way, the second output data 84 being presented to the remote user 82 may more closely align with the situation of the local user 70. As an example, such second output data 84 may enable the remote user 82 to provide certain instructions, such as guidance of the local user 70 through the industrial automation system 72. In additional embodiments, the remote user 82 may manually select a location of which the processing system 62 may receive the first input data 76. That is, instead of receiving first input data 76 that is associated with the location of the local user 70, the processing system 62 may receive first input data 76 that is associated with a location indicated by the remote user 82. In further embodiments, the remote user 82 may be able to select different local users 70, and the processing system 62 may track a particular location of a selected one of the local users 70, receive first input data 76 associated with the particular location and/or the local user 70, and cause the extended reality device 52 to present the second output data 84 based on such first input data 76. Therefore, when the local user 70 moves and/or when the remote user 82 selects a different local user 70 (e.g., thereby indicating first input data 76 of a different location is to be received), the processing system 62 may receive updated first input data 76 and cause the extended reality device 52 to present corresponding updated second output data 84.

The processing system 62 may also cause the extended reality device 52 to present second output data 84 that is more closely associated with a different entity, such as a machine (e.g., a robot) that may be physically located in the industrial automation system 72 and is being remotely controlled by the remote user 82 (e.g., to complete a desired task). That is, the processing system 62 may determine a location of the machine and may receive first input data 76 that is associated with the location. As the location of the machine changes (e.g., based on the control by the remote user 82), the processing system 62 may receive updated first input data 76. Additionally, the processing system 62 may cause the extended reality device 52 to present second output data 84 specifically associated with the machine. By way of example, the processing system 62 may determine a movement, a position, and/or an orientation of the machine, and the processing system 62 may cause the extended reality device 52 to present second output data 84 based on the movement, the position, and/or the orientation. For instance, based on a determination that a leg of the machine is being moved, the processing system 62 may cause the extended reality device 52 to impart haptic feedback on a corresponding leg of the remote user 82. Further, in response to a determination that an arm of the machine is in contact with an object, the processing system 62 may cause the extended reality device 52 to impart haptic feedback on a corresponding arm of the remote user 82. The remote user 82 may then use the second output data 84 to more accurately or desirably control the machine to perform a desired task.

In further embodiments, the extended reality device 52 and/or processing system 62 may enable interactions between various users, such as between multiple remote users 82 that may each be utilizing a respective extended reality device 52. As an example, a respective location, such as a respective location within a shared virtual coordinate space, of each remote user 82 relative to one another may be determined, and a respective projection or visual representation of each remote user 82 may be generated via the extended reality devices 52 based on the respective locations. Indeed, the respective projection of each remote user 82 may be positioned relative to one another based on the respective location of each remote user 82 within the virtual coordinate space and a determined movement of each remote user 82. That is, based on a determination of a remote user 82 moving from a first location to a second location, the projection corresponding to the remote user 82 within the projection may also be moved accordingly. Output data may also be presented based on an interaction with the projection. By way of example, such interaction may be indicated based on a first location of a first remote user 82 within the shared virtual coordinate space overlapping with a second location of a second remote user 82 within the shared virtual coordinate space (e.g., the first remote user 82 is shaking hands with the second remote user 82). In response to a determination of such an interaction, the respective extended reality devices 52 may present corresponding output data, such as haptic feedback indicative of the interaction.

In addition to using the input data (e.g., first input data 76, second input data 88) for presenting output data (e.g., first output data 80, second output data 84), the processing system 62 may perform other actions with respect to the input data. In an example, the processing system 62 may store the input data (e.g., received input data, categorized input data) and/or corresponding output data in the database 68, and the processing system 62 may retrieve the stored data at a later time, such as to present information associated with the input data and/or to present the output data at a later time. For instance, the processing system 62 may associate the input data and/or the output data with an identifier, such as an event (e.g., a maintenance event). Based on a user input indicative of a request to retrieve information associated with the identifier, such as to simulate the event, the processing system 62 may retrieve the input data and/or the output data and cause the extended reality device 52 to present the retrieved input data and/or output data to a user, thereby simulating a previous status of the industrial automation system 72. The user may therefore observe or experience a variety of stored information, such as for better understanding of a status history of the industrial automation system 72. In additional embodiments, the processing system 62 may process historical input data to simulate similar or related situations. For example, the processing system 62 may receive input data associated with a first operational status (e.g., during a first operational mode of the industrial automation component 74) of the industrial automation system 72, such as a status that caused a maintenance task or operation to be performed. In response, the processing system 62 may determine output data to be presented based on such input data and associate the output data with the first operational status of the industrial automation system 72. At a later time, the processing system 62 may simulate the first operational status of the industrial automation system 72, such as to train a remote user 82 to perform the maintenance ask, by presenting the stored output data associated with the first operational status of the industrial automation system 72. In this way, the processing system 62 may present a more immersive environment to simulate different situations associated with the industrial automation system 72 without having to change a real-world status of the industrial automation system 72.

Figure 2:
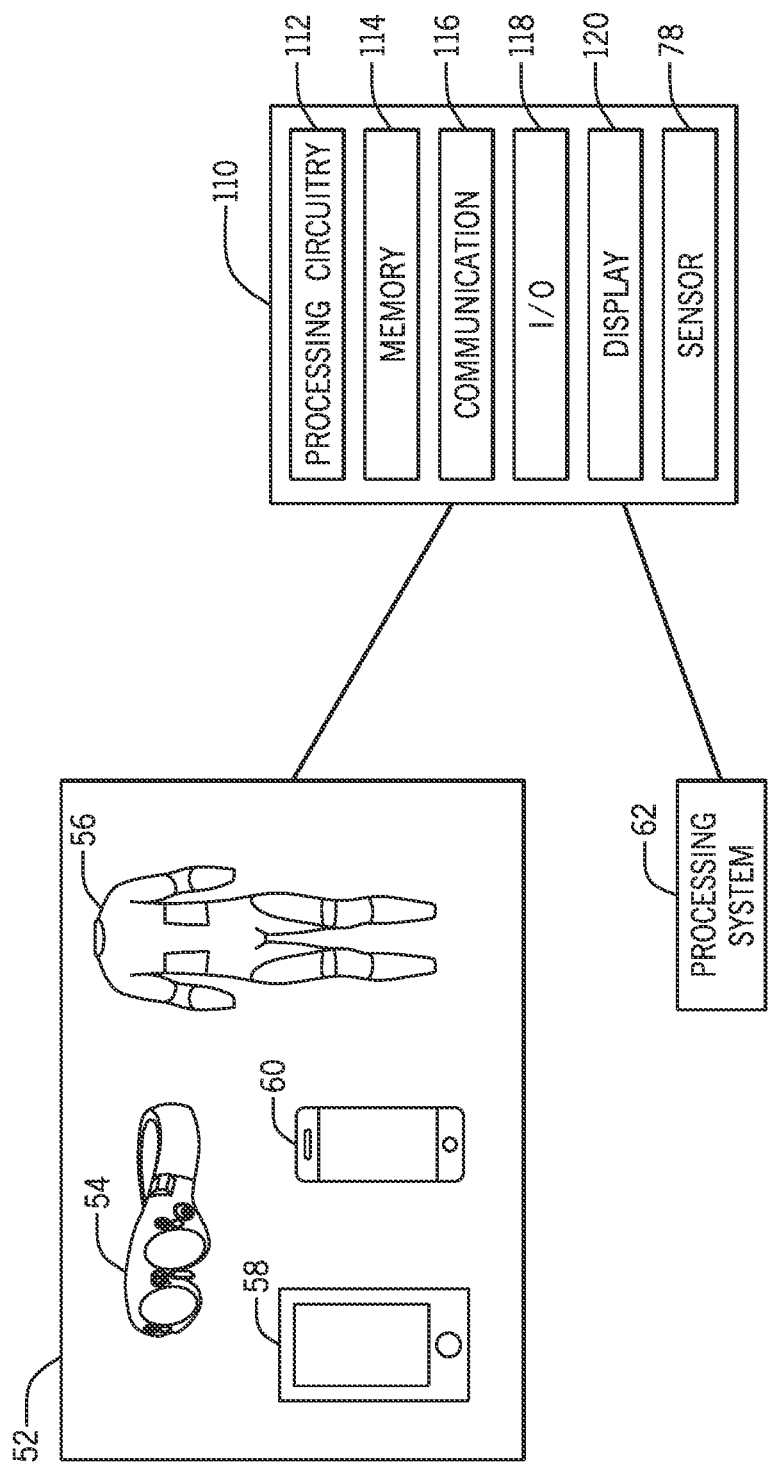
FIG. 2 is a schematic diagram of a computing system that may be incorporated in a device or system being used to present data to a user, in accordance with an embodiment of the present disclosure.

FIG. 2 is a schematic diagram of an embodiment of a computing system 110, which may be incorporated in the extended reality device 52 and/or the processing system 62 to perform the techniques described herein. The computing system 110 may include processing circuitry 112, which may be any suitable type of computer processor or microprocessor capable of executing computer-executable code, including but not limited to one or more central processing units (CPUs), field programmable gate arrays (FPGAs), application-specific integrated circuits (ASICs), programmable logic devices (PLDs), programmable logic arrays (PLAs), and the like. The processing circuitry 112 may, in some embodiments, include multiple processors. The computing system 110 may also include a memory 114 or any suitable articles of manufacture that serve as media to store processor-executable code, data, and the like. The memory 114 may store non-transitory processor-executable code executed by the processing circuitry 112 to perform the presently disclosed techniques, such as to cause the output data 80, 84 to be presented.

The computing system 110 may further include a communication component 116, which may be a wireless or a wired communication component that may facilitate establishing a connection with the communication link 64 to enable communication (e.g., between the extended reality device 52 and the processing system 62). This wired or wireless communication component may include any suitable communication protocol including Wi-Fi, mobile telecommunications technology (e.g., 2G, 3G, 4G, 5G, LTE), Bluetooth®, near-field communications technology, and the like. The communication component 112 may include a network interface to enable communication via various protocols such as EtherNet/IP®, ControlNet®, DeviceNet®, or any other industrial communication network protocol.

The computing system 110 may additionally include an input/output (I/O) port 118 that may enable the computing system 100 to communicatively couple to another external device, such as the communication component 116 and/or the database 68, via a physical connection (e.g., wiring, cable). Further still, the computing system 110 may include a display 120, which may be any suitable image-transmitting component that may display an image. For example, the display 120 may be a display screen that presents a combination of real-world image data associated with the field user's physical surroundings with computer-generated image data associated with computer-generated elements to supplement the real-world image data. In another example, the display 120 may include a transparent display that enables direct viewing of the real-world surroundings, and virtual elements may be superimposed onto the transparent display within the real-world surroundings (e.g., as a heads-up display). In certain embodiments, the computing system 110 may also include the sensor(s) 78 that may monitor the first input data 76 and/or the second input data 88. For instance, the sensor(s) 78 may be communicatively coupled to the processing circuitry 112 to enable the processing circuitry 112 to perform the techniques described herein based on the data received from the sensor(s) 78.

Each of FIGS. 3-7, 11, 13, and 14 discussed below illustrates a respective method or process that may be performed based on the features described with respect to FIGS. 1 and 2. Each method may be performed to assist the local user 70 and/or the remote user 82 to perform a task. In some embodiments, each of the methods may be performed by a single respective device or system, such as by the computing system 110 (e.g., the processing circuitry 112). In the present disclosure, the methods are described as being performed via the processing system 62. However, in additional embodiments, multiple devices may perform the different steps. For example, the processing system 62 may perform the methods in combination with one or more extended reality devices 52. It should also be noted that additional steps may be performed with respect to the described methods, and/or certain steps of the depicted methods may be removed, modified, and/or performed in a different order. Further still, the steps of any of the respective methods may be performed in parallel with one another, such as at the same time and/or in response to one another.

Figure 3:
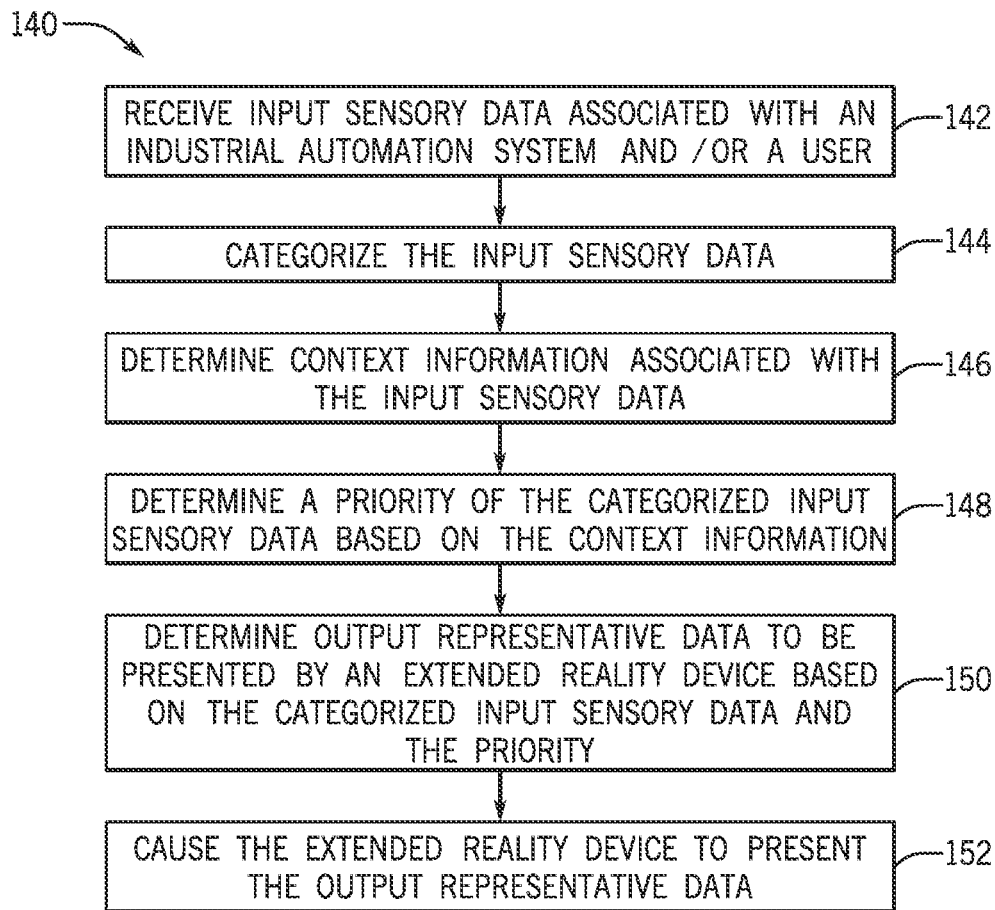
FIG. 3 is a flowchart of a method or process for presenting output representative data based on input sensory datasets and related context information, in accordance with an embodiment of the present disclosure.

FIG. 3 is a flowchart of an embodiment of a method or process 140 for presenting output data (e.g., the first output data 80, the second output data 84). At block 142, the processing system 62 may receive input sensory datasets (e.g., the first input data 76, the second input data 88) associated with the industrial automation system 72 (e.g., associated with an environment of the industrial automation system 72, of the local user 70, of the remote user 82). In some embodiments, the processing system 62 may receive the input sensory datasets from the sensor(s) 78. In additional embodiments, the processing system 62 may receive the input sensory datasets via a user input. The input sensory datasets may include any suitable sensory datasets described herein, such as visual data, audio data, haptic data, biometric data, gustatory data, and/or olfactory data.

At block 144, the processing system 62 may categorize the input sensory datasets to form or generate categorized input sensory datasets. That is, the processing system 62 may associate the input sensory datasets with one or more categories (e.g., sensory dataset categories). For instance, the processing system 62 may categorize the input sensory datasets based on the format of the data (e.g., image data, audio data) and/or an object or information pertaining to the data. As an example, image data of the industrial automation component 74 and/or a movement of a user may be associated with a work category; image data associated with the view of the user and retina reading of the user may be associated with a focus category; image data and/or audio data associated with the industrial automation system 72 may be associated with a system status category; a heart rate, a body temperature, a blood pressure, and/or a respiratory rate may be associated with a stress category; and a temperature of the industrial automation system 72 may be associated with a virtual category.

At block 146, the processing system 62 may determine context information associated with the input sensory datasets. The context information may include an identifier (e.g., a job title or role, a name) of the user associated with the extended reality device 52, a type of the extended reality device 52, a location (e.g., of the local user 70, of the remote user 82, of the extended reality device 52), a time stamp (e.g., a time of the day, the week, the month, the year), an activity (e.g., the task being performed with respect to the industrial automation system 72), an issue to be addressed or mitigated (e.g., via performance of the activity) or any combination thereof.

In some embodiments, the processing system 62 may determine the context information based on received data, such as the received input sensory datasets (e.g., metadata indicated by the received input sensory datasets). In an example, the processing system 62 may determine the identifier of the user based on image data of the user. In another example, the processing system 62 may determine the activity based on an image data of the user and/or the industrial automation system 72 (e.g., the industrial automation component 74). For instance, the processing system 62 may execute instructions to perform image recognition on image data, thereby enabling the processing system 62 to determine a task being performed by a user, an item the user is working with (e.g., a particular tool) or on (e.g., the industrial automation component 74), and/or one or more objects or people included in the image data. In a further example, the processing system 62 may determine that the user is located in the industrial automation system 72 (e.g., to determine that the user is a local user 70 and not a remote user 82) based on a location sensor. In yet another example, the processing system 62 may query the extended reality device 52 to determine the context information. For instance, the processing system 62 may transmit a request to the extended reality device 52 to indicate which format of information may be presented by the extended reality device 52. That is, for example, the request may cause the extended reality device 52 to indicate whether the extended reality device 52 may present image data, audio data, haptic feedback, and so forth. Further still, the processing system 62 may use speech recognition to determine the context information. By way of example, the processing system may identify spoken words (e.g., spoken instructions provided by the remote user 82) and determine the context information based on the words.

In additional embodiments, the processing system 62 may determine the context information based on a user input. As an example, the user may directly indicate that the user is located in the industrial automation system 72 and/or a desired task to be completed. In such embodiments, the processing system 62 may also verify the context information, such as by determining whether the user is qualified to perform the indicated desired task based on information (e.g., a certification, a level of focus) associated with the user and received via the sensor(s) 78. Indeed, the processing system 62 may perform an action in response to unsuccessful verification of the context information, such as by blocking data from being presented to the user until the unverified context information has been addressed.

At block 148, the processing system 62 may determine a priority of the categorized input sensory datasets based on the context information. That is, the processing system 62 may determine an order in which the different categories and therefore the different information associated with the categories may be prioritized. In some embodiments, the processing system 62 may determine the priority based on information that is most relevant, important, and/or beneficial to the user utilizing the extended reality device 52. By way of example, the processing system 62 may determine whether the stress category has a higher or a lower priority than the system status category based on the context information. For instance, the local user 70 using the extended reality device 52 may already know their own stress level and therefore may not need information related to the stress category, and the processing system 62 may therefore prioritize the stress category below the system status category. However, it may be beneficial for the remote user 82 assisting the local user 70 and using the extended reality device 52 to know the stress level of the local user 70 and provide better instructions accordingly, so the processing system 62 may therefore prioritize the stress category above the system status category. In additional embodiments, the processing system 62 may determine the priority based on a user preference, which may indicate preferred categories and/or formats of data. Thus, the processing system 62 may prioritize the categories based on information associated with the user, such as an identifier of the user, a user input, and so forth. In certain embodiments, the processing system 62 may use a list (e.g., stored in the database 68) to set the priority. The list may define respective priorities of the different categories for different context information. The processing system 62 may therefore compare the context information with the list to select a corresponding respective priority to associate with each category.

At block 150, the processing system 62 may determine output representative data to be presented by the extended reality device 52 based on the categorized input sensory datasets and the priority (e.g., to enable the user to intake, observe, or process the information more easily and/or effectively). The output representative data may correspond to the information included in the input sensory datasets. The processing system 62 may determine a quantity or amount of such information to be presented via the output representative data. That is, the processing system 62 may determine which information (e.g., information associated with the user, information associated with the industrial automation system 72) to be presented. The processing system 62 may additionally determine a format in which the output representative data is to be presented. For instance, the processing system 62 may determine whether different information or data is to be presented via image data, text, audio data, haptic feedback, another suitable format, or any combination thereof.

By way of example, a greater quantity of information associated with categorized input sensory datasets of a higher priority may be presented, and/or such information may be presented at a higher intensity (e.g., larger image data and/or text, louder audio data, more pronounced haptic feedback). However, a lesser quantity of information associated with categorized input sensory datasets of a lower priority may be presented, and/or such information may be presented via smaller text and/or haptic feedback. In another example, the context information may indicate that the extended reality device 52 is unable to present output representative data in a certain format (e.g., via haptic feedback). Thus, the processing system 62 may determine that information is to be presented in a different format (e.g., via image data and/or audio data instead of via haptic feedback) regardless of the priority. By way of example, the processing system 62 may determine components (e.g., the display 120, a speaker, an eccentric rotating mass vibration motor) incorporated in the extended reality device 52. At block 152, in response to determining the output representative data to be presented, the processing system 62 may cause the extended reality device 52 to present such output representative data. In other embodiments, the processing system 62 may provide the output representative data to the extended reality device 52, and the extended reality device 52 may cause the output representative data to be presented (e.g., via the display 120).

To help provide more context for operations included in the process 140, in one example, the context information may indicate that the user is a local user 70 performing an action with respect to the industrial automation system 72 (e.g., based on a location of the local user 70, an identifier of the local user 70, an assigned task, information associated with the industrial automation system 72). In response, the processing system 62 may prioritize presenting output representative data corresponding to the system status category over output representative data corresponding to a stress category associated with the user. Furthermore, the processing system 62 may determine that the output representative data may be presented in a manner that does not obstruct the view of the user to enable the user to view and interact with the industrial automation system 72. As a result, the processing system 62 may cause the extended reality device 52 to present the output representative data associated with the system status category, such as an overview performance of the industrial automation system 72, via an audio output, and the processing system 62 may not present output representative data associated with the stress category, such as a heart rate of the user. In other words, the processing system 62 may provide data determined to be most pertinent to the user in a manner will not obstruct the user's view while also not providing data that is of a lower priority (e.g., below a threshold priority level), that would obstruct the user's view, or both. However, in response to a determination (e.g., based on audio data of the input sensory datasets) that the noise level in the industrial automation system 72 is greater than a threshold noise level, the processing system 62 may cause the extended reality device 52 to present the output representative data associated with the system status category using smaller visual elements (e.g., text) that may be more effectively presented to the user as compared to using audio data and without obstructing the view of the user.

In another example, the context information may indicate that the user is a remote user 82 performing an action with respect to the industrial automation system 72. For this reason, the processing system 62 may prioritize presenting output representative data associated with the work category over output representative data associated with the focus category. Additionally, the processing system 62 may determine that the output representative data may be presented via image data without hindering the remote user's ability to perform a task based on such context information. Thus, the processing system 62 may cause the extended reality device 52 to present the output representative data associated with the work category, such as an operation of the industrial automation component 74, via a visual output, and the processing system 62 may present the output representative data associated with the focus category, such as whether the remote user 82 is viewing the correct section of an image data representing the industrial automation component 74, via a haptic output (e.g., a vibration).

In a further example, the context information may indicate that the user is a remote user 82 assisting a local user 70 with performing an action associated with the industrial automation system 72. Thus, the processing system 62 may prioritize presenting to the remote user 82 output representative data associated with the stress category over output representative data associated with the work category, and the processing system 62 may determine that the output representative data may be presented via image data to enable the remote user 82 to view such data more clearly. In response, the processing system 62 may cause the extended reality device 52 to present the output representative data, such as a heart rate, associated with the stress category via a visual output and to present the output representative data, such as a component specification, associated with the work category via an audio output. The processing system 62 may also present other information, such as via visual data or indicators, associated with the local user 70 and/or the industrial automation system 72 to the remote user 82. In this manner, the remote user 82 may modify the presented work instructions based on the stress level and the visual data and better guide the local user 70 to perform the action.

In such embodiments, the local user 70 may also be utilizing a separate extended reality device 52 to facilitate performance of the task. The processing system 62 may therefore cause the extended reality device 52 of the local user 70 to prioritize and present output representative data based on the context information indicative that the local user 70 is being assisted by the remote user 82. For example, the processing system 62 may cause the extended reality device 52 of the local user 70 to increase the priority of the work category and may therefore cause the extended reality device 52 of the local user 70 to present work instructions modified and provided by the remote user 82 via visual data. The processing system 62 may present the visual data (e.g., text) in a manner that helps the local user 70 perform a task while also avoiding obstruction of the view of the local user 70. Indeed, the processing system 62 may present different data and/or present data in different formats to the local user 70 and the remote user 82 via the respective extended reality devices 52. That is, the first output data 80 presented to the local user 70 via the extended reality device 52 of the local user 70 may be different from the second output data 84 presented to the remote user 82 via the extended reality device 52 of the remote user 82. For example, the processing system 62 may cause the extended reality device 52 of the remote user 82 to present the second output data 84 in a first format that enables the remote user 82 to provide instructions and/or guidance to the local user 70, and the processing system 62 may cause the extended reality device 52 of the local user 70 to present the first output data 80 in a second format that enables the local user 70 to perform actions to complete the task, such as based on the instructions and/or guidance provided by the remote user 82.

Further still, the context information may indicate a different status of the local user 70 and/or the remote user 82. For example, as described above, the processing system 62 may determine a location of the local user 70 relative to a target location. The processing system 62 may determine output representative data to be presented according to such relative location, such as by presenting output representative data in a spatial position that helps guide the local user 70 toward the target location. In addition, the processing system 62 may determine a stress level of the local user 70 and/or of the remote user 82 and may cause the extended reality device 52 to present output representative data based on the stress level. By way of example, in response to determining that the local user 70 and/or the remote user 82 has an increased stress level (e.g., based on a biometric data value exceeding a threshold value), the processing system 62 may cause the extended reality device 52 to reduce the intensity (smaller image data and/or text, quieter audio data, less pronounced haptic feedback, slower speed of a sequence) in which the output representative data is presented to try to reduce the stress level of the local user 70 and/or the remote user 82. Moreover, the processing system 62 may determine a target focus (e.g., a target location, target information) of the local user 70 and/or the remote user 82. The processing system 62 may determine the manner in which the output representative data is to be presented based on the target focus. For instance, the processing system may increase the intensity of certain output representative data (e.g., audio data) to guide the attention of the local user 70 and/or of the remote user 82 toward the target focus or otherwise capture the attention of the local user 70 and/or of the remote user 82. In this way, the processing system 62 may cause the output representative data to be presented based on a variety of statuses of the local user 70 and/or the remote user 82 to enable completion of a task.

The processing system 62 may also adjust the priority of the output representative data based on a desired task to be performed with respect to the industrial automation system

72. As an example, the processing system 62 may determine that the remote user 82 is assisting the local user 70 with performing an inspection of the industrial automation system 72, such as based on a current time stamp compared to a maintenance schedule of the industrial automation system 72. In response, the processing system 62 may prioritize the focus category to enable the remote user 82 to determine whether the local user 70 is visually inspecting the industrial automation system 72 accurately. Thus, the processing system 62 may cause the extended reality device 52 of the remote user 82 to present output representative data associated with the focus of the local user 70, such as a field of view or perspective of the local user 70, via image data (e.g., video data), in addition to presenting output representative data associated with the stress and/or visual indicators as text and/or image data.

As another example, the processing system 62 may determine that the remote user 82 is assisting the local user 70 with replacing or repairing a part of the industrial automation component 74. In response, the processing system 62 may prioritize the system status category over the stress category. For instance, the processing system 62 may present the output representative data associated with the system status of the industrial automation system 72, such as a fault of a component of the industrial automation system 72, via image data, in addition to presenting output representative data associated with the work instructions and the visual indicators as text and/or image data. However, the processing system 62 may present output representative data associated with the stress (e.g., a respiratory rate) of the local user 70 via haptic feedback, such as tactile pressure points. In certain embodiments, the processing system 62 may cause similar data to be presented to the local user 70 as well to enable both the remote user 82 and the local user 70 to intake the same information and better enable correspondence and interaction between the local user 70 and the remote user 82. In such cases, while the information provided the remote user 82 and the local user 70 may be provided with the same information, the format(s) of the information provided to the remote user 82 may differ from the format(s) of the information provided to the local user 70.

In the examples described above, the processing system 62 may automatically determine the manner in which the output representative data may be presented to the user by prioritizing received input sensory datasets. Indeed, such prioritization of the input sensory datasets may enable the user to quickly and accurately process relevant information to determine how to proceed with performing a task. However, in some embodiments, content and/or a format of the output representative data may be adjustable from a default or initial setting (e.g., a default prioritization may be changed to a requested prioritization). For example, the user may request to manually set the priority of the input sensory datasets. Such settings may be stored (e.g., for a profile associated with the user) and may be retrieved later to present the output representative data in a similar manner, such as for the user to perform a similar task.

Figure 4:
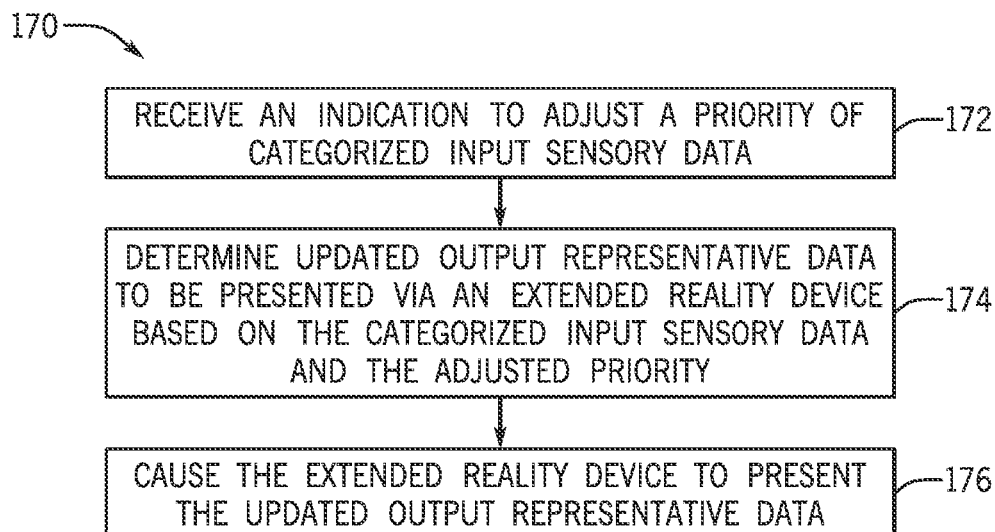
FIG. 4 is a flowchart of a method or process for presenting output representative data based on an adjustment of a priority of input sensory datasets, in accordance with an embodiment of the present disclosure.

With this in mind, FIG. 4 is a flowchart of a method or process 170 for adjusting the output representative data that may be presented by the extended reality device 52. For instance, the process 170 may be performed after certain steps, such as the steps associated with blocks 142-148 of the process 140, have been performed to determine a priority of categorized sensory datasets. At block 172, the processing system 62 may receive an indication to adjust a priority of categorized input sensory datasets. For example, in some embodiments, the processing system 62 may receive a user input via the extended reality device 52 indicating that the priority of the categorized input sensory datasets is to be adjusted. In additional embodiments, the processing system 62 may receive the indication automatically (e.g., without a user input).

At block 174, in response to receiving the indication to adjust the priority of the categorized input sensory datasets, the processing system 62 may determine updated output representative data to be presented by the extended reality device 52 based on the categorized input sensory datasets and the adjusted priority. That is, the processing system 62 may determine updated output representative data based on the categorized input sensory datasets and the received indication to adjust the priority of the categorized input sensor datasets. For example, based on the adjustment in priority, certain input sensory datasets may no longer be presented, certain input sensory datasets may be presented in a different format (e.g., from being presented via visual data to being presented via audio data), and/or additional input sensory datasets may be presented. At block 176, in response to determining the updated output representative data to be presented, the processing system 62 may cause the extended reality device 52 to present the updated output representative data.

In certain embodiments, the processing system 62 may perform the process 170 based on the received input sensory datasets indicating that the priority of categorized input sensory datasets is to be adjusted. By way of example, the received input sensory datasets may indicate that the user has moved from a first location within the industrial automation system 72 to a second location outside of the industrial automation system 72 (e.g., indicative that the user transitioned from being a local user 70 to being a remote user 82). In response, the processing system 62 may update the manner in which the output representative data may be presented to the user based on the change in location, such as by presenting more visual data based on a determination that the user is now a remote user 82. Conversely, if a determination is made that a remote user 82 has become a local user 70, the format of the output representative data provided by the extended reality device 52 may also modified. For instance, relatively less visual data and more audio data and/or haptic feedback may be provided to the local user 70. In another example, the input sensory data may indicate that a stress level of the user is increasing (e.g., biometric data, such as the heart rate, associated with the user may exceed a threshold value, audio feedback, such as a tone of voice or key words, provided by the local user 70 matching with corresponding audio feedback indicative of increased stress, certain data, such as image data, indicative that the local user 70 is not completing the task), and the processing system 62 may cause the extended reality device 52 to present a lesser quantity or amount of information (e.g., information associated with categorized input sensory datasets of a lower priority) in response. In this way, the processing system 62 may better enable the user to perform the task by accounting for updates or changes associated with the situation of the user.

In additional embodiments, the processing system 62 may perform the process 170 based on a user input, such as a user input transmitted in response to an interaction with the extended reality device 52. As an example, the user input may include information (e.g., a direct indication of the location of the user) that the processing system 62 may use to determine whether the priority of the categorized input sensory datasets is to be adjusted. As another example, the user input may directly indicate a request to adjust the priority of the categorized input sensory datasets. That is, for instance, the user input may directly indicate or define a particular priority of certain categories and/or that a priority of a particular one of the categories is to be increased or decreased. Thus, the processing system 62 may adjust the priority based on or tailored to the user input regardless of the input sensory datasets being received.

Indeed, the user input may indicate a preference of how the output representative data is to be presented. For example, the preference may indicate that output representative data associated with the system status category is to be presented via haptic feedback (e.g., rather than image data). In certain embodiments, the preference(s) indicated by a user may be associated with a profile of the user. The processing system 62 may then store the profile and the associated preference(s) (e.g., in the database 68) and retrieve the profile at a later time to present the output representative data based on the preference(s). For example, the processing system 62 may retrieve the profile based on a received user input and/or based on other information (e.g., image data, user credentials, identifier) associated with the user. The processing system 62 may then determine the preference(s) associated with the retrieved profile and present the output representative data based on the preference(s). Indeed, the processing system 62 may store multiple profiles that may each include a different set of preferences, and the processing system 62 may retrieve the respective profiles to present the output representative data in different manners in accordance with the profiles. Thus, the processing system 62 may accommodate the preference(s) of different users without each user having to manually re-implement the preference(s) during usage. In additional embodiments, each profile may be associated with other information, such as the task to be performed, the location of the extended reality device 52, the industrial automation component 74, and so forth, and the processing system 62 may retrieve the profile based on a detection of the other information (e.g., indicated via the context information) and present the output representative data based on the retrieved profile.

In further embodiments, the processing system 62 may receive an indication to adjust other manners in which the output representative data is to be presented by the extended reality device 52. For example, the processing system 62 may receive an indication of a request to present a certain category of data and/or a specific type of data in a particular format, such as to present output representative data associated with stress (e.g., heart rate data) via text. The processing system 62 may also receive an indication of a request to remove certain data that is being presented or to block a particular format in which data is being presented. In other words, the indication may request to filter out a certain category or type of data (e.g., to block output representative data associated with stress from being presented) and/or to block data from being presented in a particular manner (e.g., to block output representative data from being presented via audio data). Such indications may be received automatically (e.g., based on the input sensory datasets being received) and/or based on a user input, and the processing system 62 may update the output representative data to be presented by the extended reality device 52 based on the indications. In this way, the manner in which the processing system 62 may cause the extended reality device 52 to present the output representative data may be adjustable to accommodate various factors and better present data that may help the user perform a task.

In addition to causing the extended reality device 52 to present output representative data based on context information and/or input sensory data, the processing system 62 may also predict an intent of the user and cause the extended reality device 52 to present output representative data based on the intent. As described herein, the intent of the user includes an action that the user is to perform to complete a desired task. For example, the intent may include one or more steps for completing the desired task. The intent may be associated with a target output or outcome. In other words, successful completion of the intent by the user may produce a desirable result of the industrial automation system 72 and/or of the industrial automation component 74. Thus, the processing system 62 may present the output representative data to facilitate achieving the target output.

Figure 5:
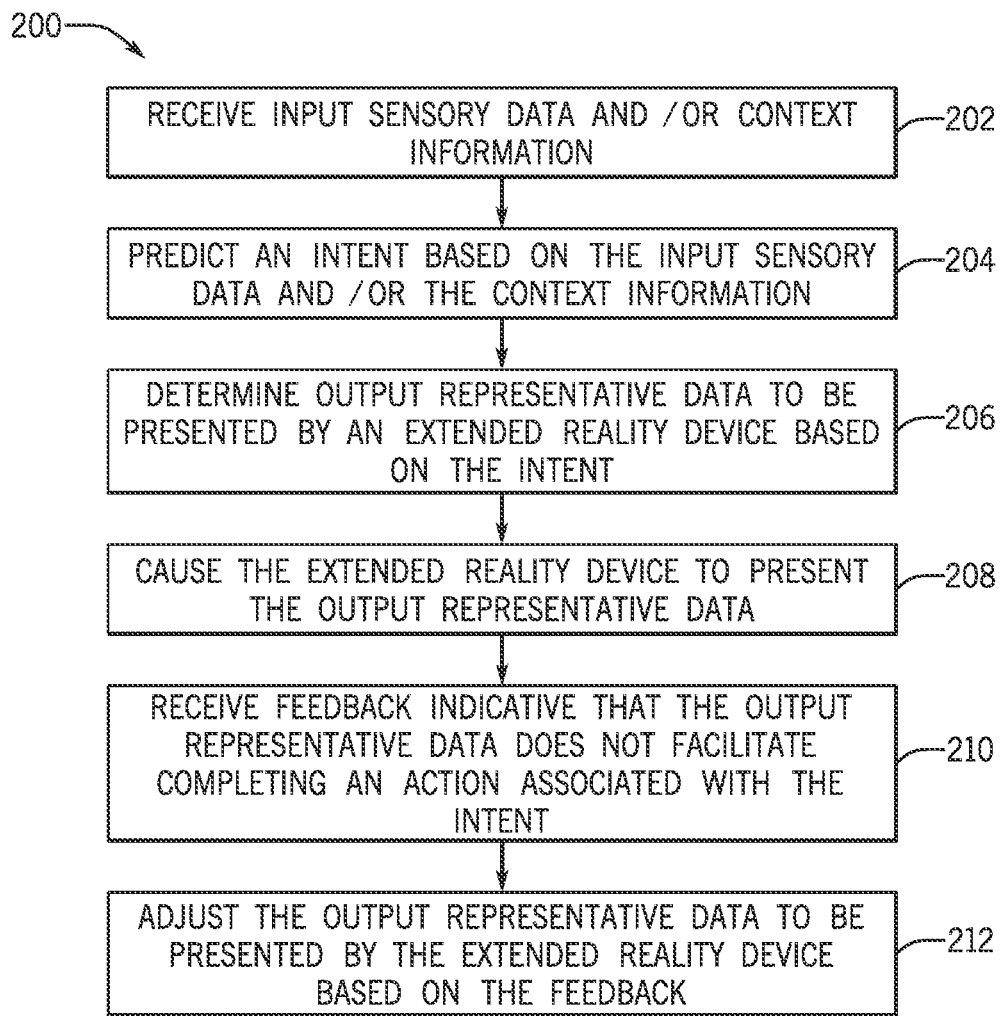
FIG. 5 is a flowchart of a method or process for presenting output representative data based on an intent of a user, in accordance with an embodiment of the present disclosure.

FIG. 5 is a flowchart of an embodiment of a method or process 200 for presenting output representative data based on the intent of the user. At block 202, the processing system 62 may receive input sensory data and/or context information. By way of example, the processing system 62 may receive the input sensory data by performing the step described with respect to block 142 of the method 140, and the processing system 62 may receive the context information by performing the step described with respect to block 146 of the method 140. Such input sensory data may include audio data, vibration data, operating speed data (e.g., rotational speed of a motor), temperature data, other suitable data, or any combination thereof.

At block 204, the processing system 62 may predict the intent of the user based on the input sensory data and/or the context information. In some embodiments, the database 68 may store a list of intents and different input sensory data (e.g., operating parameter values) and/or context information associated with each intent of the list of intents. The processing system 62 may select an intent from the list of intents based on a match between the received input sensory data and/or context information with corresponding input sensory data and/or context information associated with the intent. In additional embodiments, the processing system 62 may determine the desirable task of the user (e.g., based on the input sensory data and/or the context information) and may determine the intent based on the task. For instance, the database 68 may store a list of tasks and one or more intents associated with each task. Upon selection of the task, the processing system 62 may then identify the intent(s) specifically associated with the task and select a corresponding intent.

As an example, based on a determination that there is an alarm (e.g., based on received audio data) and that an identity of the user is associated with a technician (e.g., based on received user input), the processing system 62 may determine that the user is to perform a maintenance task or operation. As another example, the processing system 62 may compare the input sensory data with respective ranges of values corresponding to expected or desirable operations. For instance, the processing system may determine that a maintenance task is to be performed based on one or more of the input sensory data being outside of respective ranges of values. In certain embodiments, different maintenance tasks may be associated with different combinations of input sensory data being outside of a corresponding range of values (e.g., as defined via a database table stored in the database 68), and the processing system 62 may select a maintenance task based on the comparison between the input sensory data with the corresponding range of values. By way of example, the processing system 62 may determine that a first maintenance task (e.g., replacement of a motor) is to be performed based on the operating speed data being below a first range of values and the audio data being below a second range of values (e.g., to indicate the motor is faulty). The processing system 62 may also determine that a second maintenance task (e.g., reducing operation of the industrial automation component 74) is to be performed based on the operating speed being above the first range of values and the temperature data being above a third range of values (e.g., to indicate overheating and/or overuse of a motor of the industrial automation component 74). The processing system 62 may then select an intent associated with the specific maintenance task.

At block 206, the processing system 62 may determine output representative data to be presented by the extended reality device 52 based on the predicted intent to present at least a portion of the input sensory data. That is, the processing system 62 may determine output representative data to be presented by the extended reality device 52, such as an amount of information to be presented and/or a format in which the output representative data is to be presented. Such output representative data may facilitate the user with completing an action associated with the intent, such as by processing information more easily and/or effectively. The processing system 62 may also determine the output representative data based on the context information to enable completion of the action. For instance, the processing system 62 may determine a location of the extended reality device 52 (e.g., indicative of whether the user is a local user 70 or a remote user 82), an identity of a user utilizing the extended reality device (e.g., to determine a profile associated with the user and indicative of a preferred format to present the output representative data), available output devices of the extended reality device to present the output representative data in various formats, and so forth. Indeed, the processing system 62 may determine output representative data (e.g., a format of the output representative data) that enables completion of the action in view of the received context information. At block 208, the processing system 62 may then cause the extended reality device 52 to present such output representative data (e.g., by transmitting an instruction to the extended reality device 52, by directly providing transmitting the output representative data to the extended reality device 52).

In certain embodiments, the processing system 62 may determine that the intent of the user has changed and may therefore determine updated output representative data to be presented. By way of example, the processing system 62 may determine a target output or result associated with completion of the action associated with the intent. The target output may include a target visual output (e.g., an appearance of the industrial automation system 72 and/or of the industrial automation component 74), a target audio output (e.g., a sound generated via operation of the industrial automation system 72 and/or of the industrial automation component 74), an operating status (e.g., an operating mode), a performance (e.g., a temperature, a vibration, an operating speed of the industrial automation system 72 and/or of the industrial automation component 74), another suitable output, or any combination thereof. The processing system 62 may determine that the action has been completed based on a determination that the target output was achieved (e.g., based on received audio data, image data, temperature data, vibration data, operating speed data). In additional embodiments, the processing system 62 may determine that the action has been completed based on a user input. For example, the user may interact with the extended reality device 52 to indicate or verify that the action has been successfully completed, such as by selecting a menu visually presented to the user and/or by providing audio feedback (e.g., spoken words).

After determining that the action has been completed, the processing system 62 may then predict a subsequent intent of the user. For instance, the processing system 62 may determine the subsequent intent (e.g., including an additional action to complete the task) based on updated input sensory data and/or context information. Additionally, the processing system 62 may select the subsequent intent from a set of intents associated with the identified task stored in the database 68. The processing system 62 may therefore repeat performance of any of the steps described in blocks 202, 204, 206, 208 in response to a determination that a previous intent is no longer relevant. Indeed, the output representative data being presented may dynamically change as the user completes various actions. Furthermore, the processing system 62 may cause the extended reality device 52 to present output representative data indicative that the action associated with the intent has been successfully completed. Thus, the processing system 62 may inform the user when each action has been completed, such as to notify the user that updated output representative data is to be presented to facilitate completion of an additional action.

At block 210, the processing system 62 may receive feedback indicative that the output representative data being presented by the extended reality device 52 does not facilitate completing the action associated with the intent. The processing system 62 may identify receipt of feedback indicative that the output representative data does not facilitate completing the action associated with the intent based on the feedback indicating that the target output was not achieved. For example, the processing system 62 may receive user feedback (e.g., a menu selection, a gesture, audio feedback, haptic feedback, biometric data) from the user. The user feedback may indicate increased stress and/or frustration of the user as well as how the output representative data does not facilitate completing the action. For instance, the user feedback may include an increased audio level of the user with spoken keywords associated with the deficiencies of the output representative data (e.g., that the output representative data facilitates completion of an action associated with a different intent). In additional embodiments, the processing system 62 may receive a user input (e.g., via the extended reality device 52) that directly indicates that the output representative data does not facilitate completing the action.

In some embodiments, the processing system 62 may determine that the intent was incorrectly identified (e.g., as indicated by the user input) in response to receiving the feedback. As a result, the processing system 62 may perform the step described at block 204 to re-predict the intent of the user and/or by prompting the user to provide the intent via user input. In additional embodiments, the processing system 62 may determine that the intent was correctly predicted (e.g., as indicated by the user input) in response to receiving the feedback, but the manner in which the output representative data is presented does not enable completion of the action associated with the intent. As an example, the processing system 62 may receive a user input indicative that the amount of information and/or the format of the output representative data does not enable the action to be completed. In response, the processing system 62 may perform the step described at block 206 to re-determine output representative data to be presented by the extended reality device 52, such as to present different information and/or to present the output representative data in a different format.

At block 212, the processing system 62 may then adjust the output representative data to be presented by the extended reality device 52 based on the received feedback. For instance, in response to determining that the intent was incorrectly predicted, the processing system 62 may determine a new intent and determine corresponding output representative data associated with the new intent (e.g., based on information stored in the database 68). In response to determining that the intent was correctly predicted and that the output representative data does not enable completion of the action associated with the intent, the processing system 62 may adjust how the output representative data associated with the intent is presented. In some embodiments, the processing system 62 may prompt the user to transmit a user input indicative of specific information or a format associated with presentation of the output representative data (e.g., a preferred manner in which the output representative data is to be presented). The processing system 62 may then cause the extended reality device 52 to present the output representative data based on the user input. As such, the processing system 62 may adjust how the output representative data is presented to the user to better facilitate completion of the action.

In addition to adjusting output representative data for a single user, the processing system 62 may adjust a default setting in which output representative data may be presented for multiple users. The default setting refers to a manner in which output representative data may be initially presented without receiving user input indicative of a request to change how the output representative data is presented (e.g., as described with respect the method 170 of FIG. 4). That is, the default setting may define which information (e.g., corresponding to at least a portion of the input sensory datasets) is to be presented and/or a data presentation format in which the information is presented. However, the processing system 62 may change the default setting based on feedback indicative that the default setting is not preferred (e.g., does not facilitate completing a task), such as via user input, thereby changing how the output representative data may be initially presented to a user. For instance, the processing system 62 may adjust the default setting to avoid receiving subsequent requests (e.g., use inputs) to change how the output representative data is presented. In this manner, the adjusted default setting of the output representative data may better facilitate completion of a task.

Figure 6:
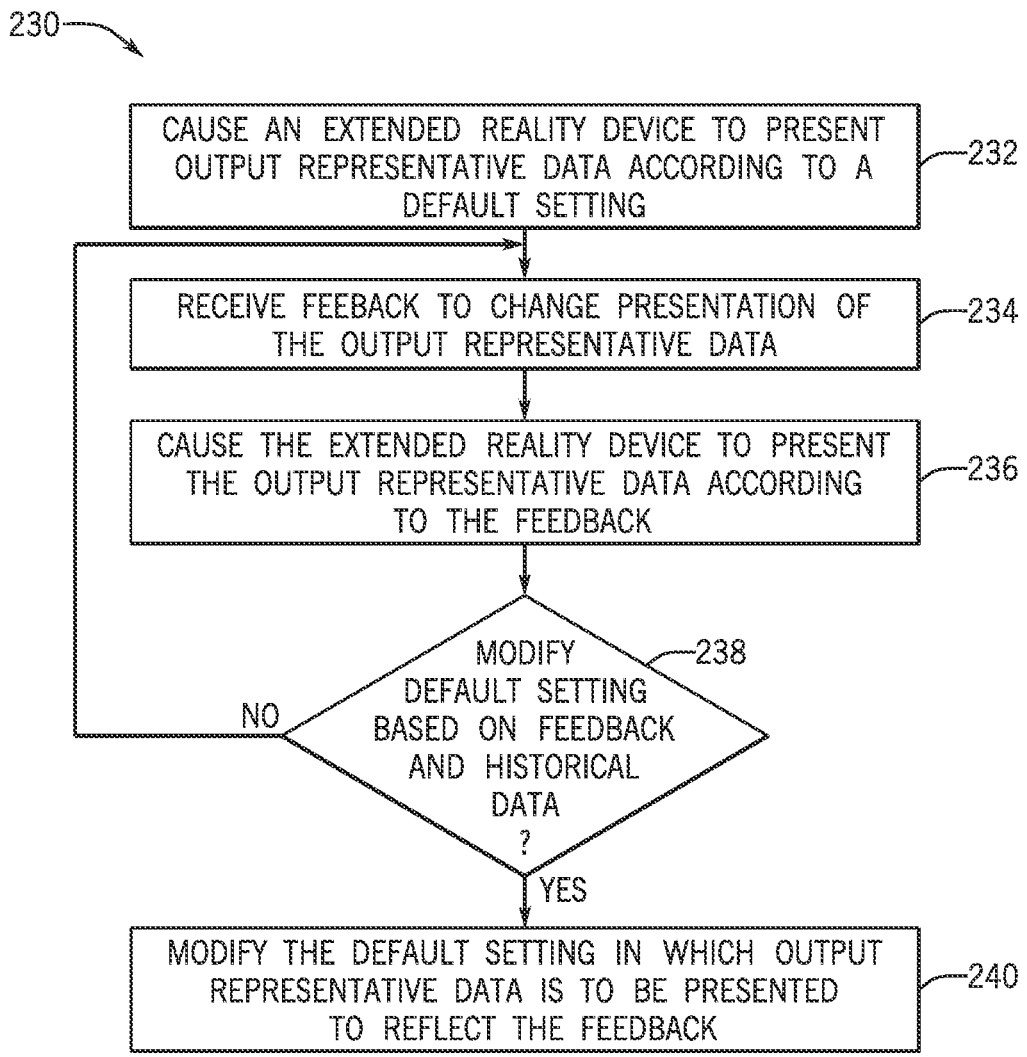
FIG. 6 is a flowchart of a method or process for modifying a default setting in which output representative data is presented, in accordance with an embodiment of the present disclosure.

With the preceding in mind, FIG. 6 is an embodiment of a method or process 230 for modifying the default setting in which output representative data is presented. At block 232, the processing system 62 causes the extended reality device 52 to present output representative data according to a default setting. For example, respective default settings may be defined (e.g., within the database 68) and associated with various priorities and/or different context information of categorized input sensory data. Thus, the processing system 62 may select a corresponding default setting based on the determined priority of the categorized input sensory data and/or the determined context information. The processing system 62 may then cause the extended reality device 52 to present the output representative data in the manner defined by the selected default setting.

At block 234, the processing system 62 may receive feedback to change presentation of the output representative data. That is, the feedback may indicate that the output representative data is to be presented in a different manner than that defined by the default setting. In some embodiments, the feedback may include a user input received via the extended reality device 52 (e.g., to indicate a desired or preferred manner in which the output representative data is to be presented). For example, the user input may indicate changing the data presentation format in which certain information is to be presented, presenting additional information (e.g., corresponding to a portion of input sensory datasets not previously presented via the initial output representative data), or removing certain information (e.g., corresponding to a portion of input sensory datasets previously presented via the initial output representative data) from being presented. In additional embodiments, the feedback may indicate that a task or action was not successfully completed (e.g., via the step performed at block 210 of the method 200). As an example, the feedback may include received sensor data indicating that a target output was not achieved and/or a user input directly indicative that the task or action was not completed. Thus, the processing system 62 may determine that particular information being provided via the output representative data does not facilitate completion of the task, and the processing system 62 may adjust the format in which the particular information is being presented.

At block 236, the processing system 62 may cause the extended reality device 52 to present the output representative data according to the feedback. In embodiments in which the feedback is received via a user input that defines a manner in which the output representative data is to be presented, the processing system 62 may cause the extended reality device 52 based on the manner defined by the user input. In embodiments in which the feedback is received based on a determination that a task or action was not successfully completed, the processing system 62 may perform a further analysis to determine how the output representative data is to be presented. By way of example, the processing system 62 may determine that the same or a similar task or action was previously completed at a different time (e.g., by a different user), determine the manner in which the output representative data was previously presented at that time, and present the output representative data in the same manner as the previously presented output representative data. Additionally, one or more alternative settings may be defined (e.g., within the database 68) and associated with the default setting. The alternative setting(s) may also define the manner (e.g., an alternative data presentation format) in which the output representative data is to be presented, and the processing system 62 may select a corresponding alternative setting in response to receipt of the feedback. For instance, each alternative setting may be associated with a rank or order number, and the processing system 62 may select the alternative setting having the next highest rank or order number and cause the extended reality device 52 to present the output representative data according to the alternative setting in response to receiving the feedback.

At block 238, the processing system 62 may determine whether the default setting is to be adjusted based on the feedback and historical data associated with presentation of the output representative data. For example, the historical data may indicate that the processing system 62 has previously received the same or a similar feedback to change the presentation of the output representative data. As such, the processing system 62 may monitor a number of times in which the same or similar feedback has been received. The processing system 62 may then compare the number to a threshold number.

In some embodiments, the database 68 may store information associated with changes to the output representative data presented by multiple different extended reality devices 52. As an example, the database 68 may store profiles of different users who may utilize a different extended reality device 52, and each profile may include respective preferred settings (e.g., defining preferred information to be presented and/or preferred formats to present the output representative data), which may be input, set, created, or adjusted by the corresponding user. Each preferred setting may be adjusted from a corresponding default setting. The processing system 62 may determine a number of preferred settings that are different from the corresponding default setting (e.g., indicative that a corresponding number of users changing presentation of the default settings) and determine whether the default setting is to be modified based on the number. For instance, the processing system 62 may determine a number of preferred settings that indicate operating data of an industrial automation component 74 is to be presented via audio data instead of via visual data as defined by the default setting.

In additional embodiments, the processing system 62 may determine preferred settings of a single user (e.g., of a profile associated with the user) and modify the default settings associated with the user. For instance, the processing system 62 may determine a preference of the user during applications or situations associated with certain context information. The processing system 62 may then determine whether the preference is to be applied during other applications associated with different context information. By way of example, the processing system 62 may determine that preferred settings for a profile of a local user 70 indicates that operating data of an industrial automation component 74 is to be presented via visual data for performing a maintenance task, an inspection task, and a replacement task. As a result, the processing system 62 may also determine whether the preferred settings for the profile of the local user 70 is to be modified to present the operating data of the industrial automation component 74 via visual data for performing other tasks as well, such as an installment task or a task performed on a different industrial automation component.

In response to a determination that the default setting should not be modified based on the feedback and the historical data (e.g., the number of received feedbacks is below the threshold number), the processing system 62 may not change the default setting. As such, the processing system 62 may select the default setting and initially present subsequent output representative data in the same manner as previously defined by the default setting. In certain embodiments, the processing system 62 may modify the preferred settings of the local user 70 (e.g., of the profile associated with the local user 70) from which the feedback was received to change the presentation of the output representative data, but the processing system 62 may not change the default settings or preferred settings of other users in response to the determination that the default setting should not be modified.

However, in response to a determination that the default setting should be modified, the processing system 62 may modify the default setting to reflect the received feedback, as described at block 240. For example, the received feedback may directly indicate an adjustment of the priority of categorized input sensory data, that output representative data of a certain category is to be presented in a first format rather than in a second format, that specific output representative data is not to be presented, and the processing system 62 may apply the adjustment to the default setting. For instance, the processing system 62 may identify profiles having preferred settings that have not already been modified according to the received feedback, and the processing system 62 may modify the profiles to update the preferred settings based on the received feedback. That is, the processing system 62 may modify the profiles such that each profile reflects the received feedback (e.g., to include the modified default setting). In embodiments in which the processing system 62 is adjusting the default settings associated with a single user, the processing system 62 may prompt the user to confirm that the default setting is to be adjusted in the manner determined by the processing system 62. As such, the processing system 62 may also verify that the default setting is to be adjusted based on a user input. After modifying the default setting, the processing system 62 may present subsequent output representative data in the manner defined by the modified default setting instead of in the manner previously defined by the unmodified default setting.

In some circumstances, it may be desirable to store, retrieve, and present interactions between users (e.g., between a local user 70 and a remote user 82) utilizing the techniques described above to facilitate other users performing the same or a similar task. For example, the processing system 62 may be utilized to enable the local user 70 and the remote user 82 to interact with one another (e.g., by communicatively coupling their respective extended reality devices 52) to complete a task. For instance, the processing system 62 may present the first output data 80 (e.g., in a first data presentation format) to the local user 70 via the extended reality device 52 of the local user 70 and present the second output data 84 (e.g., in a second data presentation format) to the remote user 82 via the extended reality device 52 of the remote user 82. During presentation of the first output data 80 and the second output data 84, the processing system 62 may receive the first input data 76 from the local user 70 and the second input data 88 from the remote user 82, such input data 76, 88 including different feedback provided as interactions (e.g., verbal exchanges) between the local user 70 and the remote user 82 and/or such input data 76, 88 including data (e.g., image data) that is directly presented. The interactions between the local user 70 and the remote user 82 may help the same or a different local user 70 complete another task and/or help the same or a different remote user 82 better help the local user 70 complete another task. That is, the interactions, which may not be included in the first output data 80 or the second output data 84 to complete an initial, may provide supplemental information that may help completion of a subsequent task. As such, various information associated with the interaction may be stored, retrieved, and presented for training purposes, such as an instructional video, textual work instructions, and the like, that can be presented (e.g., without additional input after initiating presentation). Although the present disclosure primarily discusses usage of interactions between the local user 70 and the remote user 82, interactions between any suitable users, such as between local users 70, between remote users 82, and/or between multiple different types of users, may be used as training content.

Figure 7:
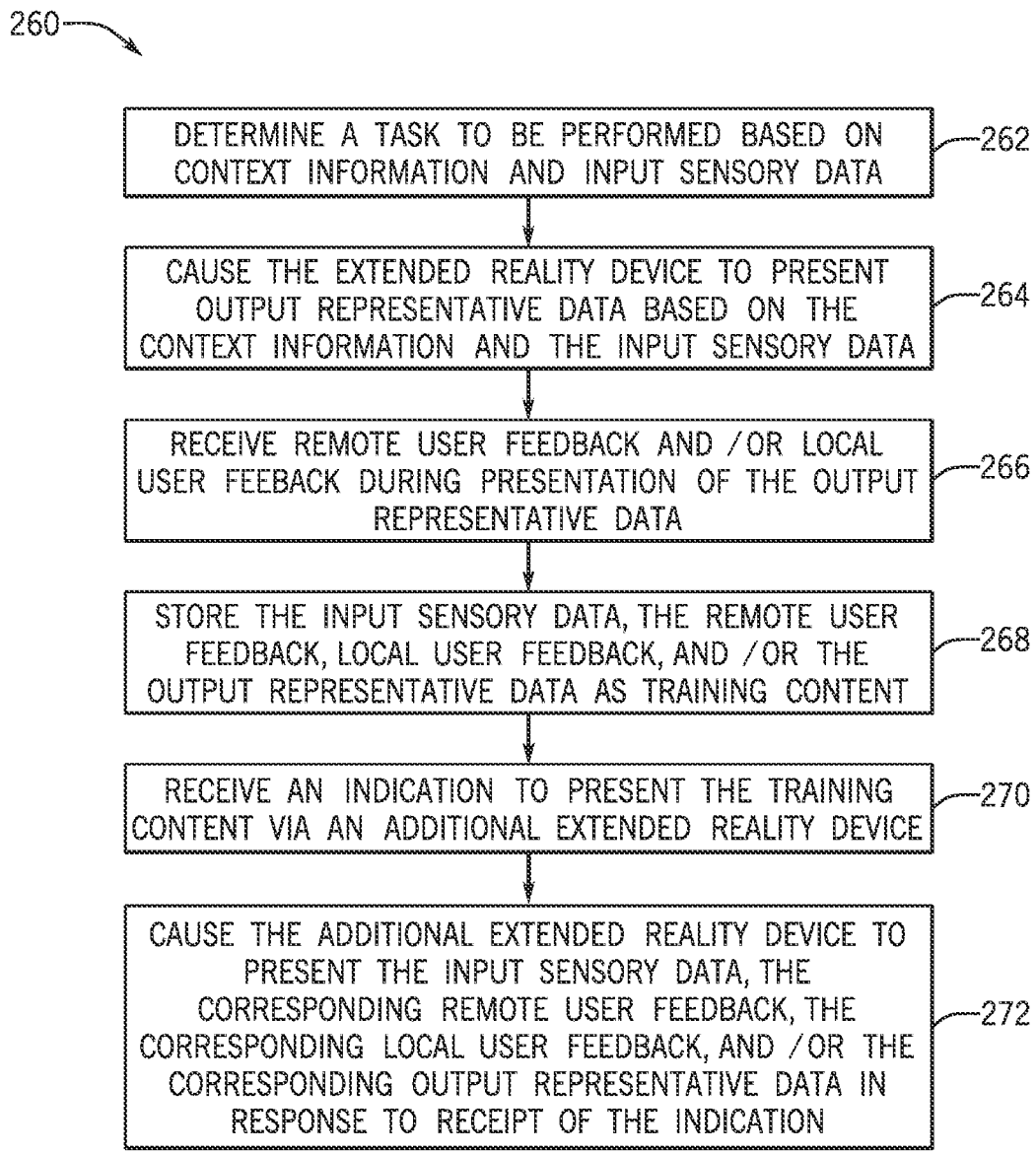
FIG. 7 is a flowchart of a method or process for presenting stored information associated with previous usage of an extended reality device, in accordance with an embodiment of the present disclosure.

FIG. 7 is a flowchart of a method or process 260 for storing an interaction between the local user 70 and the remote user 82 and retrieving information associated with the interaction for presentation. However, in certain embodiments, a method similar to the method 260 may be performed for utilizing an interaction between the users. At block 262, the processing system 62 may determine a task to be performed based on context information and input sensory data. For example, the processing system 62 may determine a specific maintenance task to be performed using the techniques described above based on a comparison between the input sensory data (e.g., audio data, vibration data, operating speed data, temperature data) and respective threshold ranges. The processing system 62 may also determine the task to be performed based on a user input (e.g., provided via the extended reality device 52) and/or based on an identifier of a user.

At block 264, the processing system 62 may cause the extended reality device 52 to present output representative data based on the context information and the input sensory data using the techniques described above. During presentation of the output representative data, the processing system 62 may receive remote user feedback and/or local user feedback, as shown at block 266. As an example, the processing system 62 may receive the remote user feedback via the extended reality device 52 of the remote user 82, and the remote user feedback may include guidance provided by the remote user 82 to assist the local user 70, such as audio feedback (e.g., spoken words) and/or image feedback (e.g., modification of the video displayed to the local user 70). In response, the processing system 62 may cause the extended reality device 52 of the local user 70 to present the remote user feedback. For instance, the processing system 62 may cause the extended reality device 52 to present audio data and/or image data corresponding to the received audio feedback and/or image feedback. The processing system 62 may also receive the local user feedback via the extended reality device 52 of the local user 70 and/or the sensor(s) 78, and the local user feedback may include reactions of the local user 70 made in response to receipt of the remote user feedback, such as audio feedback, image feedback, biometric data, and the like.

At block 268, the processing system 62 may store the input sensory data, the remote user feedback (e.g., the audio data and/or the image data corresponding to the remote user feedback), the local user feedback, and/or the output representative data as training content (e.g., in the database 68) for performing the task determined with respect to block 262. In some embodiments, the processing system 62 may store such training content in response to a determination that there currently is no previously stored training content associated with performing the task. In an example, the processing system 62 may determine the task (e.g., based on context information and/or input sensory data), determine whether there is associated training content stored in the database 68, and store the input sensory data, the remote user feedback, the local user feedback, and/or the output representative data in response to a determination that there is no training content associated with the task stored within the database 68. In another example, the processing system 62 may store training content regardless of whether there is associated training content stored in the database 68. For instance, the processing system 62 may store training content each time the processing system 62 is in operation (e.g., each time the processing system 62 communicatively couples extended reality devices 52 of users) to perform a task. In a further example, the processing system 62 may store training content based on a user input (e.g., received from the local user 70, received from the remote user 82), which may indicate a request to store the training content.

At block 270, the processing system 62 may receive an indication to present the training content via an additional extended reality device 52. In some embodiments, the processing system 62 may receive the indication via a user input (e.g., by a different user utilizing the additional extended reality device 52) indicative of a request to assist with performing the task associated with the training content. In additional embodiments, the processing system 62 may receive additional context information and/or additional input sensory data, and the processing system 62 may automatically determine that the task associated with the training content is to be performed (e.g., without receiving a user input) based on the additional context information and/or the additional input sensory data. That is, the processing system 62 may receive the indication based on a determination that the same task associated with the training content is to be performed (e.g., by a different user utilizing the additional extended reality device 52).

At block 272, in response to receiving the indication, the processing system 62 may retrieve the training content (e.g., from the database 68) and cause the additional extended reality device 52 to present the input sensory data, the remote user feedback, the local user feedback, and/or the output representative data. In some embodiments, the processing system 62 may present the training content in the same format than that initially received, presented, and stored. For example, the output representative data may include a video of the view of the local user 70, and the processing system 62 may present the video during presentation of the training content. In additional embodiments, the processing system 62 may present the training content in a different format. As an example, the output representative data may include biometric data (e.g., of the local user 70) initially presented via audio data (e.g., to the remote user 82). However, the processing system 62 may present the biometric data via image data during presentation of the training content.

The input sensory data, the remote user feedback, and/or the local user feedback may provide additional information to facilitate completion of the task. By way of example, the information may include instructions given by a previous remote user 82 (e.g., to a previous local user 70) and not presented via previous output representative data, and the instructions may better guide a current local user 70 perform a desirable action. The information may additionally include expected results or outputs associated with actions performed by a previous local user 70, and the expected results may help the current local user 70 identify which actions are to be performed to achieve a desired result. Further, the information may help a current remote user 82 determine instructions to provide to the local user 70 (e.g., whether previously provided instructions successfully enabled a previous local user 70 to perform a desirable action, the impact of previously provided instructions on the biometric data of a previous local user 70) to complete the task. In this manner, the processing system 62 may better enable completion of the task with use of the training content, such as by supplementing the training content with output representative data being presented.

Multiple User Collaboration

In some circumstances, it may be desirable for users at different locations to interact with one another with respect to the industrial automation system 72. For example, different locations may include different remote environments (e.g., different geographic locations), different locations within the same environment (e.g., within the same industrial automation system 72), and other locations in which the users may not be able to physically or directly communicate with one another. However, the users may desire to refer to the same equipment (e.g., the same industrial automation component 74) or other parts of the industrial automation system 72. The techniques discussed herein may improve the collaboration between users located at different locations, such as by simulating real-life interactions between the users through presentation of virtual elements. For example, the processing system 62 may cause different output representative data associated with the industrial automation system 72 to be presented to the remote users in order to realistically simulate a virtual environment representative of the industrial automation system 72. Thus, the processing system 62 may provide the users with relevant information that may facilitate user interactions with respect to the industrial automation system 72, such as to determine an operation to perform on the industrial automation system 72. Furthermore, the processing system 62 may cause output representative data associated with the users to be presented to one another, thereby enabling the users to interact more easily with one another, such as by simulating real-life communication between users. As such, the processing system 62 may facilitate users performing interactions with one another and/or with the industrial automation system 72.

Figure 8:
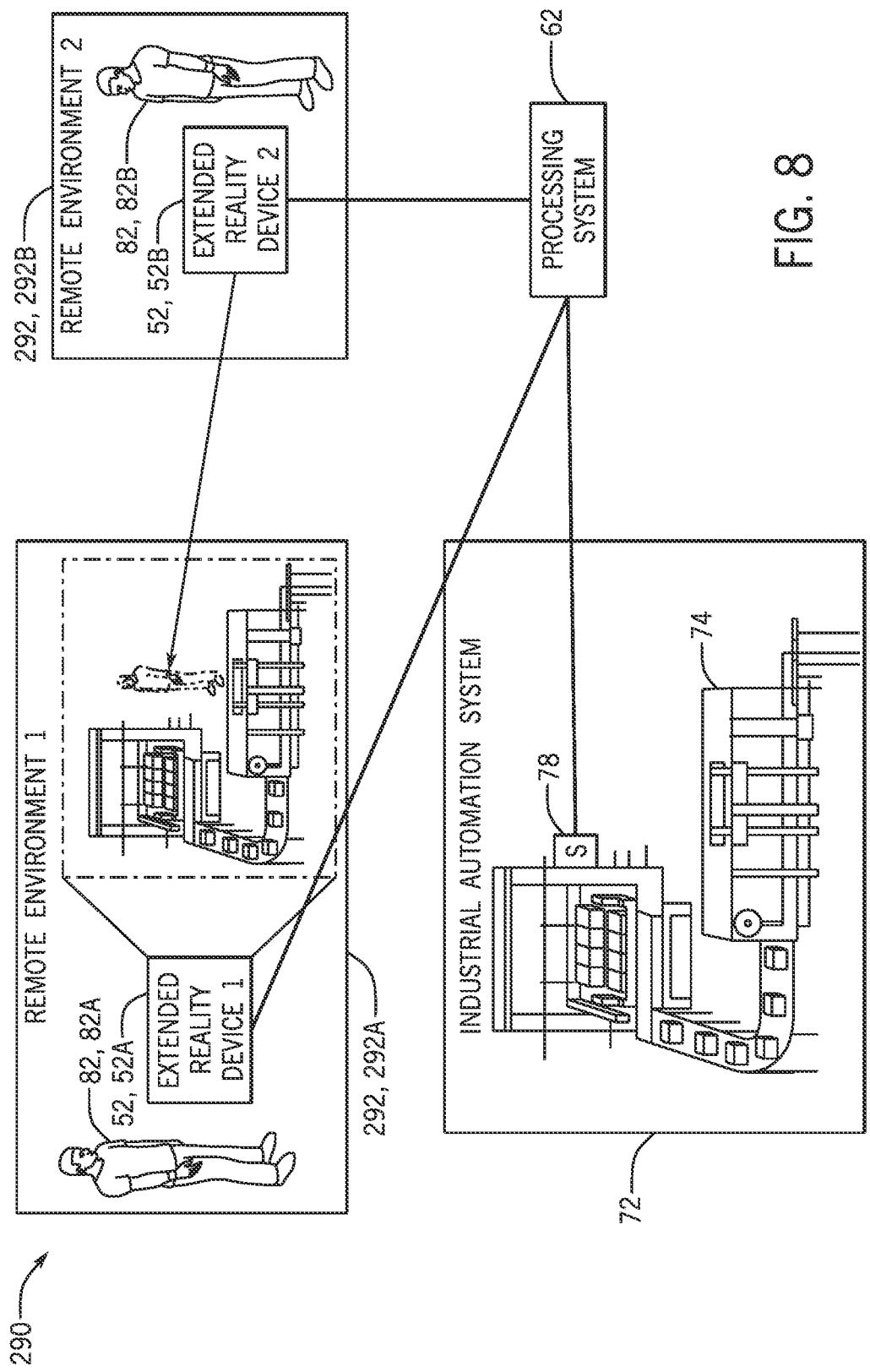
FIG. 8 is a schematic diagram of a communicating network to present output representative data based on virtual positionings in a virtual coordinate system, in accordance with an embodiment of the present disclosure.

FIG. 8 is a schematic diagram of an embodiment of a communication network 290 for enabling multiple user collaboration between a first remote user 82A and a second remote user 82B. The remote users 82 may be located at different remote environments 292. For example, the first remote user 82A may be located in a first remote environment 292A, and the second remote user 82B may be located in a second remote environment 292B, such that the first remote user 82A and the second remote user 82B may not physically interact with one another (e.g., speak directly to one another without usage of additional devices). For instance, each of the remote environments 292 may include different areas of the same room (e.g., different office cubicles), different rooms of the same building, different geographical locations, and the like. In some embodiments, at least one of the remote environments 292 may be separate from a portion or section of the industrial automation system 72. Thus, neither of the remote users 82 may be able to interact directly with certain equipment (e.g., industrial automation components 74) of the industrial automation system 72. Additionally, at least one of the remote environments 292 may be a part of the industrial automation system 72. That is, at least one of the remote users 82 may be local to the industrial automation system 72, but remote relative to the other of remote user 82. Furthermore, the communication network 290 may include more than two remote users 82 remotely collaborating with one another.

Each of the remote users 82 may utilize a respective extended reality device 52. For instance, the first remote user 82A may utilize a first extended reality device 52A, and the second remote user 82B may utilize a second extended reality device 52B. The processing system 62 may operate the extended reality devices 52 to enable collaboration between the remote users 82 with one another and/or with the industrial automation system 72 by causing the extended reality devices 52 to present output representative data based on position or location. For example, the processing system 62 may receive a user input from the extended reality devices 52 indicative of a request to initiate multiple user collaboration. The user input may, for instance, indicate a request to present a visual image representative of the other user to enable multiple user collaboration. In response, the processing system 62 may use data associated with the industrial automation system 72 and/or the extended reality devices 52 to present the visual image and other outputs to facilitate multiple user collaboration.

In some embodiments, the processing system 62 may determine virtual positionings of the first remote user 82A, the second remote user 82B, and/or the industrial automation system 72 relative to one another within a virtual coordinate system, and the processing system 62 may cause the extended reality devices 52 to present output representative data based on the virtual positionings. Each of the virtual positionings may include a position, orientation, and/or pose within the same virtual coordinate system, and the processing system 62 may use the virtual positionings to present output representative data that simulates real-life physical positionings within a physical environment (e.g., the same industrial automation system 72). As an example, the processing system 62 may determine physical movement of one of the remote users 82 (e.g., within their remote environment 292), determine corresponding movement in the virtual coordinate system, and cause the extended reality device 52 of each of the remote users 82 to present updated output representative data based on the movement in the virtual coordinate system.

For instance, the processing system 62 may cause the first extended reality device 52A to present image data that includes the second remote user 82B located (e.g., positioned, oriented) within the industrial automation system 72 based on the virtual positioning of the second remote user 82B relative to the virtual positioning of the industrial automation system 72 in the virtual coordinate system. The processing system 62 may determine movement (e.g., physical movement) of the second remote user 82B in the second remote environment 292, determine corresponding movement (e.g., virtual movement) of the second remote user 82B to an updated virtual positioning in the virtual coordinate system, and cause the first extended reality device 52A to present updated image data based on the updated virtual positioning of the second remote user 82B relative to the virtual positioning of the industrial automation system 72 in the virtual coordinate system (e.g., image data that includes a new location of the second remote user 82B within the industrial automation system 72). The processing system 62 may also determine movement (e.g., physical movement) of the first remote user 82A in the first remote environment 292A, determine corresponding movement (e.g., virtual movement) of the first remote user 82A to an updated virtual positioning in the virtual coordinate system, and cause the first extended reality device 52A to present updated image data based on the updated virtual positioning of the first remote user 82A relative to the virtual positioning of the industrial automation system 72 (e.g., image data that includes a new view of the industrial automation system 72 and the second remote user 82B).

The processing system 62 may further cause the extended reality devices 52 to present other output representative data corresponding to input sensory data associated with the industrial automation system 72 and/or any of the remote users 82 (e.g., based on detections made by the sensor(s) 78 and/or the extended reality devices 52). In certain embodiments, the processing system 62 may determine a respective subset of the input sensory data that is associated with each of the virtual positionings of the remote users 82, such as by determining the virtual positioning of the sensor(s) 78 in the virtual coordinate system and selecting sensor data received from the respective sensor(s) 78 having virtual positionings that are within a threshold distance of the respective virtual positionings of the remote users 82. The processing system 62 may then determine corresponding output representative data derived from the respective subset of the input sensory data for presentation via the extended reality devices 52.

In this manner, from a plurality of received input sensory data (e.g., associated with an entirety of the industrial automation system 72), the processing system 62 may identify a subset of input sensory data relevant to (e.g., at a portion of the industrial automation system 72 proximate to) the virtual positioning of the first remote user 82A, such as operating data associated with an industrial automation component 74. The processing system 62 may determine movement of the first remote user 82A in the first remote environment 292A, such as based on positioning data received from the first extended reality device 52A (e.g., via a movement sensor of the first extended reality device 52A), and determine corresponding movement of the first remote user 82A to an updated virtual positioning in the virtual coordinate system. In response, from the plurality of received input sensory data, the processing system 62 may identify another subset of input sensory data relevant to (e.g., at another portion of the industrial automation system 72 proximate to) the updated virtual positioning the first remote user 82A, such as operating data associated with a different industrial automation component 74 proximate to the updated virtual positioning of the first remote user 82A. As a result, the processing system 62 may determine output representative data that may be relevant to the first remote user 82A based on identified subsets of the input sensory data.

The processing system 62 may similarly cause the second extended reality device 52B of the second remote user 82B to present output representative data based on the virtual positionings of the first remote user 82A, the second remote user 82B, and the industrial automation system 72 relative to one another, such as based on different subsets of input sensory data identified via the virtual positioning of the second remote user 82B relative to the virtual positioning of the industrial automation system 72. In this way, the processing system 62 may cause the extended reality devices 52 to present output representative data that may simulate real-life conditions and sensory information for the remote users 82 with respect to the industrial automation system 72, thereby improving the collaboration and interaction between the remote users 82.

To this end, the processing system 62 may receive an input associated with mapping into the virtual coordinate system (e.g., to start at respective virtual positionings within the virtual coordinate system). In some embodiments, the remote users 82 may map into the virtual coordinate system via the extended reality devices 52. For instance, the remote users 82 may be mapped into the virtual coordinate system via user inputs indicative of a selection of respective virtual positionings within the virtual coordinate system at which the remote users 82 may initiate. Moreover, the industrial automation system 72 may be mapped into the virtual coordinate system. Additional techniques associated with mapping into the virtual coordinate system are described in U.S. patent application Ser. No. 17/796,641, which is hereby incorporated by reference in its entirety for all purposes. Mapping of the remote users 82 and the industrial automation system 72 may define respective initial virtual positionings of the remote users 82 and the industrial automation system 72 within the virtual coordinate system.

Furthermore, the processing system 62 may receive sensor data indicative of physical movement of the remote users 82 to determine corresponding updated virtual positionings of the remote users 82 (e.g., relative to one another, relative to the industrial automation system 72) within the virtual coordinate system. For instance, each of the extended reality devices 52 may include a movement sensor, such as an accelerometer, a gyroscope, a global positioning system, and the like, which may detect movement of the extended reality device 52 caused by movement of the remote user 82. The processing system 62 may then determine the virtual positioning in the virtual coordinate system based on positioning and movement data received from the movement sensor. For example, the processing system 62 may receive positioning data indicative that the user moved a distance within the first remote environment 292A. In response, the processing system 62 may update the virtual positioning of the user within the virtual coordinate system to reflect movement of the user by the distance. The processing system 62 may then update the output representative data presented to the user based on the updated virtual positioning of the user.

Figure 9:
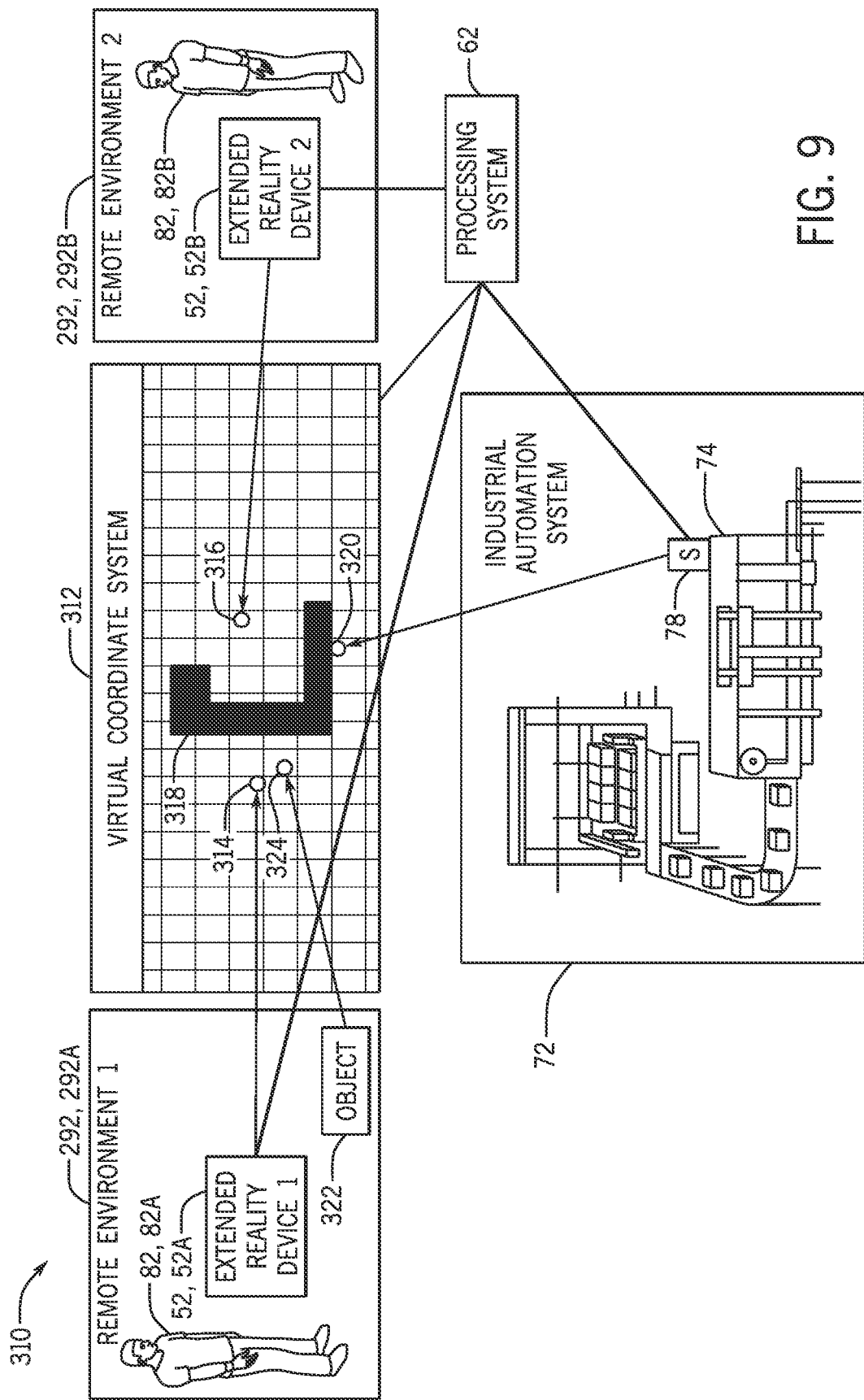
FIG. 9 is a schematic diagram of a communicating network in which various entities are mapped into a virtual coordinate system, in accordance with an embodiment of the present disclosure.

FIG. 9 is a schematic diagram of an embodiment of a communication network 310 in which the first remote user 82A, the second remote user 82B, and the industrial automation system 72 are mapped into a virtual coordinate system 312 corresponding to the industrial automation system 72. The processing system 62 may reference the virtual coordinate system 312 to determine output representative data to be presented. In some embodiments, the virtual coordinate system 312 may be stored in the processing system 62 (e.g., in the memory 114 of the processing system 62). In additional embodiments, the virtual coordinate system 312 may be stored in a different component or system (e.g., a cloud server) communicatively coupled to the processing system 62, and the processing system 62 may access the virtual coordinate system 312 via the component.

In the illustrated embodiment, the first remote user 82A is mapped into a first virtual positioning 314, the second remote user 82B is mapped into a second virtual positioning 316, and the industrial automation system 72 is mapped into a third virtual positioning 318 in the virtual coordinate system 312. The processing system 62 may determine output representative data to be presented based on the virtual positionings 314, 316, 318 relative to one another. In certain embodiments, the processing system 62 may present the output representative data in a spatial manner based on the virtual positionings 314, 316, 318 to simulate the physical positioning of the users 82 within the industrial automation system 72 and relative to one another. For instance, the processing system 62 may determine that audio output is being generated by the industrial automation system 72 at a particular area of (e.g., a particular location) the third virtual positioning 318. The processing system 62 may determine the first virtual positioning 314 relative to the area of the third virtual positioning 318 and, based on the comparison, the processing system 62 may cause the first extended reality device 52A to present corresponding output representative data based on the first virtual positioning 314 relative to the area of the third virtual positioning 318. By way of example, the third virtual positioning 318 may be to the right of the first virtual positioning 314, and the processing system 62 may therefore cause the first extended reality device 52A to present output representative data (e.g., audio output) in a manner that corresponds to the area of the third virtual positioning 318 being to the right of the first virtual positioning 314 (e.g., audio output is presented at the right side of the first remote user 82A). As another example, the third virtual positioning 318 may be farther from the first virtual positioning 314 than to the second virtual positioning 316. As such, the processing system 62 may cause the first extended reality device 52A to present output representative data (e.g., audio output) at a lesser intensity (e.g., a lower volume) than that presented by the second extended reality device 52B.

The processing system 62 may monitor movement of the remote users 82 (e.g., within the respective remote environments 292), determine corresponding movement of the respective virtual positionings 314, 316 to updated virtual positionings 314, 316 based on the movement of the remote users 82, and cause the extended reality devices 52 to present updated output representative data based on the updated virtual positionings 314, 316, 318 relative to one another. For example, the processing system 62 may cause the extended reality devices 52 to update the spatial manner in which the output representative data is presented. Thus, as the remote users 82 move within their respective remote environments 292, the presentation of the output representative data associated with the remote users 82 and/or the industrial automation system 72 may reflect such movement, thereby simulating real-life movement of the remote users 82 relative to one another and/or to the industrial automation system 72.

The processing system 62 may also cause the extended reality devices 52 to present feedback provided by the remote users 82 based on the virtual positionings 314, 316 between the remote users 82 in the virtual coordinate system 312. For instance, audio data associated with the second remote user 82B (e.g., an audio input provided by the second remote user 82B and/or audio data associated with the second remote environment 292B) may be received via the second extended reality device 52B, the processing system 62 may determine the first virtual positioning 314 of the first remote user 82A relative to the second virtual positioning 316 of the second remote user 82B, and the processing system 62 may then cause the first extended reality device 52A to provide feedback (e.g., audio feedback) corresponding to the audio data received via the second extended reality device 52B and based on the first virtual positioning 314 relative to the second virtual positioning 316. For instance, the processing system 62 may cause the first extended reality device 52 to present corresponding audio data in a spatial manner (e.g., based on a directionality of the second virtual positioning 316 relative to the first virtual positioning 314) and at an intensity (e.g., based on a distance between the first virtual positioning 314 relative to the second virtual positioning 316) to simulate the remote users 82 communicating with one another within the same physical environment.

In some embodiments, the processing system 62 may also determine that any of the virtual positionings 314, 316, 318 intersect with one another and cause the extended reality devices 52 to present feedback based on the virtual positionings 314, 316, 318 intersecting with one another. Such feedback may be presented to represent or simulate physical contact (e.g., as spatial feedback). By way of example, the processing system 62 may determine a location on the virtual positionings 314, 316, 318 where the intersection occurs and cause the extended reality devices 52 to present the feedback based on the location (e.g., relative to the virtual positionings 314, 316). In an example embodiment, the first extended reality device 52A may include multiple components configured to present feedback (e.g., haptic feedback). The processing system 62 may determine a location on the first virtual positioning 314 where the first virtual positioning and the third virtual positioning 318 intersect with one another. The processing system 62 may then determine a subset of the components corresponding to the location on the first virtual positioning and cause the subset of the components to present feedback. For instance, based on the location of intersection occurring on a right portion of the first virtual positioning 314, the processing system 62 may select a subset of components that are located on the right side of the first remote user 82A (e.g., equipped or worn on the right side of the first remote user 82A) and cause such components to present feedback. To this end, the processing system 62 may determine a positioning of the components relative to one another in order to determine the subset of components corresponding to the location of intersection. In this manner, the processing system 62 may cause presentation of feedback that more closely simulates physical contact represented by the intersection between the virtual positionings 314, 316, 318.

In certain embodiments, a particular industrial automation component 74 of the industrial automation system 72 may be mapped into the virtual coordinate system 312, such as to a fourth virtual positioning 320, as a result of the industrial automation system 72 being mapped into the virtual coordinate system 312. In other words, specific parts or equipment of the industrial automation system 72 may be mapped into the virtual coordinate system 312. The processing system 62 may cause the extended reality devices 52 to present output representative data specifically associated with the industrial automation component 74 based on the virtual positionings of the remote users 82 corresponding to the fourth virtual positioning 320 of the industrial automation component 74. As an example, in response to a determination that a distance between the first virtual positioning 314 and the fourth virtual positioning 320 is within a threshold distance, the processing system 62 may cause the first extended reality device 52A to present output representative data associated with the industrial automation component 74, such as operating data specific to the industrial automation component 74. As another example, the processing system 62 may determine a field of view of the first remote user 82A associated with the first virtual positioning 314 within the virtual coordinate system 312 (e.g., based on image data received by the first extended reality device 52A), and the processing system 62 may cause the first extended reality device 52A to present output representative data associated with the industrial automation component 74 based on the fourth virtual positioning 320 being within the field of view associated with the first virtual positioning 314.

In this manner, the processing system 62 may cause additional potentially relevant information to be provided to the remote users 82 based on the virtual positionings 314, 316 of the remote users 82 relative to the industrial automation component 74. Such information may be helpful for the remote users 82 to perform tasks and interactions, such as a maintenance operation, associated with the industrial automation component 74. Although the example discussed herein is directed to presenting output representative data associated with the industrial automation component 74, output representative data associated with other parts of the industrial automation system 72, such as a particular subsystem, a particular location, a particular section, and the like, of the industrial automation system 72, may be presented in other embodiments based on the virtual positionings 314, 316 of the remote user 82 relative to the other parts of the industrial automation system 72.

In further embodiments, another physical object 322 may be mapped into the virtual coordinate system 312, such as to a fifth virtual positioning 324. The physical object 322 is located in the first remote environment 292A in the illustrated environment, but the physical object 322 may be located in the second remote environment 292B, the industrial automation system 72, and/or at any other suitable environment in additional embodiments. As an example, the physical object 322 may include a wall, a table, or any other object 322 that may be positioned in the first remote environment 292A. The processing system 62 may cause outputs to be provided based on the fifth virtual positioning 324 of the physical object 322 relative to any of the other virtual positionings 314, 316, 318, 320 to simulate a physical presence of the physical object 322. In an example, image data and/or audio data associated with the physical object 322 may be presented by the second extended reality device 52B (e.g., relative to the industrial automation system 72) based on the fifth virtual positioning 324 of the physical object 322 relative to the third virtual positioning 318 of the industrial automation system 72. In an additional example, feedback that simulates a physical interaction (e.g., physical contact) with the physical object 322 may be presented. For instance, the processing system 62 may determine that the second virtual positioning 316 of the second remote user 82B and the fifth virtual positioning 324 of the physical object 322 intersect with one another, and the processing system 62 may therefore cause the second extended reality device 52B to present feedback (e.g., spatial haptic feedback based on a location of the intersection) in response.

The presented feedback associated with the physical object 322 may provide a realistic interaction between the physical object 322 and another entity that is not physically located within the first remote environment 292A. For instance, the processing system 62 may cause the first extended reality device 52A to present image data including a virtual representation of the second remote user 82B. The intersection between the second virtual positioning 316 of the second remote user 82B and the fifth virtual positioning 324 of the physical object 322 may indicate an interaction between the virtual representation of the second remote user 82B and the physical object 322 as provided by the first extended reality device 52A and as seen by the first remote user 82A. As a result, the feedback provided to the second remote user 82B may simulate a physical sensation experienced by the second remote user 82B when interacting with the physical object 322 to simulate the second remote user 82B being physically located within the first remote environment 292A. For example, the physical object 322 may include a wall or boundary of the first remote environment 292A, and the feedback presented by the second extended reality device 52B may guide the second remote user 82B to move away from the physical object 322 such that the physical object 322 does not block the virtual representation of the second remote user 82B presented to the first remote user 82A. Thus, the processing system 62 may increase a realistic simulation of the second remote user 82B being physically within the first remote environment 292A.

The physical object 322 may be mapped into the virtual coordinate system 312 via a user input in some embodiments. As an example, the first remote user 82A may utilize the first extended reality device 52A to define the fifth virtual positioning 324 of the physical object 322. In additional embodiments, the physical object 322 may be automatically mapped into the virtual coordinate system 312, such as based on data received from the first extended reality device 52A. The data may indicate the positioning (e.g., a physical positioning) of the physical object 322 relative to the first remote user 82A, and the processing system 62 may map the physical object 322 to the fifth virtual positioning 324 (e.g., relative to the first virtual positioning 314 of the first remote user 82A) based on the indicated positioning of the physical object 322 relative to the first remote user 82A. In an example, the data may include sensor data received from a proximity sensor, a distance sensor, and/or a ranging sensor. In another example, the data may include image data (e.g., of the first remote environment 292A). The processing system 62 may identify the physical object 322 and determine the positioning (e.g., a physical positioning) of the physical object 322 relative to the first remote user 82A based on the image data to map the physical object 322 into the virtual coordinate system 312.

Figure 10:
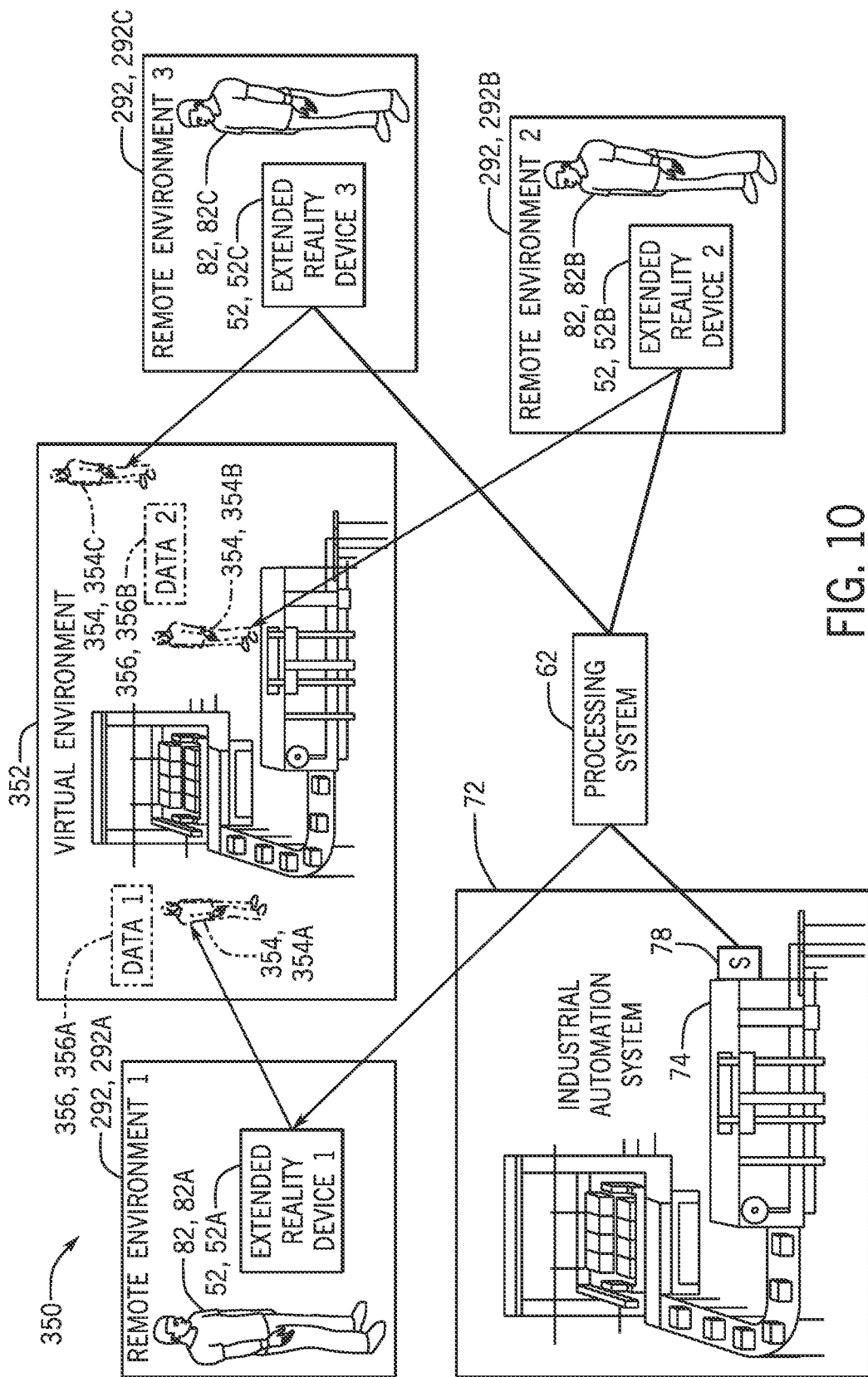
FIG. 10 is a schematic diagram of a communicating network in which various entities are mapped into a virtual coordinate system, in accordance with an embodiment of the present disclosure.

FIG. 10 is a schematic diagram of an embodiment of a communication network 350 for enabling multiple user collaboration between the first remote user 82A located within the first remote environment 292A, the second remote user 82B located within the second remote environment 292B, and a third remote user 82C located within a third remote environment 292C. Each of the remote users 82 and the industrial automation system 72 may be mapped into the virtual coordinate system 312, and the processing system 62 may cause the extended reality devices 52 to present output representative data based on the virtual positionings in the virtual coordinate system 312. In this manner, each of the remote users 82 and the industrial automation system 72 may be virtually positioned within a virtual environment 352 associated with the virtual coordinate system 312.

In the illustrated embodiment, respective virtual representations 354 of the first remote user 82A and the second remote user 82B may be presented in the virtual environment 352. That is, the processing system 62 may cause each of the extended reality devices 52B, 52C of the second and third remote users 82B, 82C, respectively, to present image data that includes a first virtual representation 354A of the first remote user 82A located within the industrial automation system 72. Additionally, the processing system 62 may cause each of the extended reality devices 2A, 52C of the first and third remote users 82A, 82C, respectively, to present image data that includes a second virtual representation 354B of the second remote user 82B located within the industrial automation system 72. For example, the virtual representations 354 of each of the first remote user 82A and the second remote user 82B may be presented based on the movement of the first remote user 82A and the second remote user 82B in the remote environments 292A, 292B, respectively. Furthermore, using the techniques described herein, output representative data may be presented to the first and second remote users 82A, 82B based on the virtual positionings of the remote users 82A, 82B in the virtual coordinate system 312, and feedback may also be presented to the first and second remote users 82A, 82B based on interactions associated with the virtual positionings of the remote users 82A, 82B (e.g., based on the virtual positionings intersecting with one another) in the virtual coordinate system 312.

Output representative data may also be presented to the third remote user 82C based on the virtual positioning of the third remote user 82C in the virtual coordinate system 312. For instance, the processing system 62 may cause the third extended reality device 52C to present output representative data associated with the industrial automation system 72 (e.g., output representative data associated with operating data of the industrial automation component 74) based on the virtual positioning of the third remote user 82C relative to the industrial automation system 72. Furthermore, the processing system 62 may cause the third extended reality device 52C to present output representative data 356 associated with the other remote users 82A, 82B based on the virtual positioning of the third remote user 82C relative to the virtual positionings of other remote users 82A, 82B. Such output representative data 356 may include identifier information (e.g., a name, a job title, contact information, experience level), a task being performed, biometric data (e.g., a stress level), or any combination thereof.

As an example, the processing system 62 may cause the third extended reality device 52C to present output representative data 356 associated with one of the other remote users 82 based on the virtual positioning of the third remote user 82C corresponding to the virtual positioning of the other remote user 82 (e.g., based on the virtual positionings being within a threshold distance of one another, based on the virtual positioning of the other remote user 82 being within a field of view associated with the virtual positioning of the third remote user 82C). For instance, the respective output representative data 356A, 356B may be presented adjacent to the associated virtual representations 354A, 354B of the remote users 82A, 82B. That is, first output representative data 356A of the first remote user 82A may be presented (e.g., as image data) adjacent to the first virtual representation 354A, and second output representative data 356B of the second remote user 82B may be presented adjacent to the second virtual representation 354B. Thus, the third remote user 82C may be provided with location-based information regarding both the industrial automation component 74 and other remote users 82.

In certain embodiments, output representative data associated with the third remote user 82C may be presented (e.g., to the first remote user 82A via the first extended reality device 52A, to the second remote user 82B via the second extended reality device 52B). For instance, a third virtual representation 354C of the third remote user 82C may be presented based on the virtual positioning of the third remote user 82C (e.g., relative to the virtual positionings of the first and second remote users 82A, 82B). Thus, each remote user 82 may be able to view a virtual representation 354 of another of the remote users 82. Furthermore, feedback may be presented based on interactions (e.g., intersections) with the virtual positioning of the third remote user 82C.

In additional embodiments, output representative data, such as a virtual representation, associated with the third remote user 82C may not be presented (e.g., to the first remote user 82A via the first extended reality device 52A, to the second remote user 82B via the second extended reality device 52B), and feedback may not be presented based on an interaction associated with the virtual positioning of the third remote user 82C (e.g., the virtual positioning of the third remote user 82C intersecting with a virtual positioning of another remote user 82 and/or of the industrial automation system 72). That is, feedback may not be presented to the third remote user 82C (e.g., via the third extended reality device 52C) based on interactions associated with the virtual positioning of the third remote user 82C in the virtual coordinate system 312. For example, feedback may not be provided to either the first remote user 82A or the third remote user 82C when the virtual positioning of the third remote user 82C and the virtual positioning of the first remote user 82A intersect with one another. In this way, the third remote user 82C may be a third-party user who observes the other remote users 82A, 82B with respect to the industrial automation system 72 without directly interacting with the other remote users 82A, 82B or the industrial automation system 72.

In further embodiments, the third remote user 82C may be located in one of the other remote environments 292A, 292B. As an example, the third remote user 82C may be physically proximate to one of the other remote users 82A, 82B. For this reason, the third remote user 82C (e.g., located within the first remote environment 292A) may be able to physically see or observe one of the other remote users 82, such as the first remote user 82A, but not another one of the remote users 82, such as the second remote user 82B. In this example, the processing system 62 may cause the third extended reality device 52C to present the second virtual representation 354B of the second remote user 82B, because the third remote user 82C may not be able to physically see the second remote user 82B. However, the processing system 62 may not cause the third extended reality device 52C to present the first virtual representation 354A of the first remote user 82A, because the third remote user 82C is able to physically see the first remote user 82A. For instance, based on an indication (e.g., a user input, location data) that the third remote user 82C is physically within a threshold distance of another remote user 82, the processing system 62 may not cause the extended reality device 52C to present the virtual representation 354 of the other remote user 82 to avoid causing the third remote user 82C to physically see the other remote user 82 and also see a separate, virtual representation 354 of the same other remote user 82.

In some embodiments, the processing system 62 may determine movement of the virtual positioning of the third remote user 82C in the virtual coordinate system 312 based on movement of the third remote user 82C in the third remote environment 292C (e.g., as indicated by positioning data transmitted via the third extended reality device 52C). In additional embodiments, the processing system 62 may receive a user input indicative of movement of the virtual positioning of the third remote user 82C in the virtual coordinate system 312 and determine movement of the virtual positioning of the third remote user 82C based on the user input. As an example, the user input may indicate a selection of a target location, position, and/or orientation relative to the industrial automation system 72 and/or an adjustment of a current location, position, and/or orientation relative to the industrial automation system 72. In further embodiments, the user input may include a selection of one of the other remote users 82. In such embodiments, the processing system 62 may associate the virtual positioning of the third remote user 82C with the virtual positioning of the selected remote user 82. That is, movement of the selected remote user 82 (e.g., within their remote environment 292) may cause corresponding movement of both the virtual positioning of the first remote user 82A and the virtual positioning of the third remote user 82C. As a result, the processing system may cause the third extended reality device 52C of the third remote user 82C to simulate the experience provided to the selected remote user 82. That is, the third remote user 82C may undergo the same or similar experience as that of the selected remote user 82. For example, the processing system 62 may also cause the third extended reality device 52C of the third remote user 82C to present the same or similar output representative data presented to the selected remote user 82 via their extended reality device 52, such as based on movement and positioning of the selected remote user 82 instead of based on the movement and positioning of the third remote user 82C.

Figure 11:
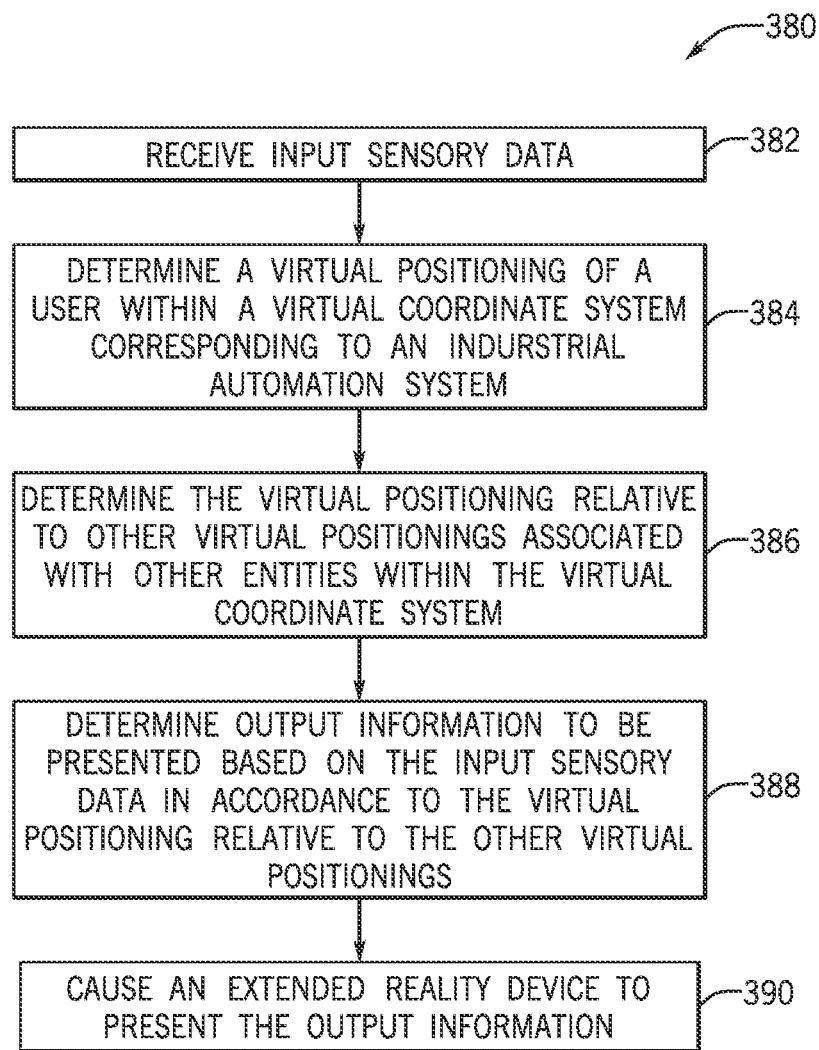
FIG. 11 is a flowchart of a method or process for presenting output representative data based on virtual positionings in a virtual coordinate system, in accordance with an embodiment of the present disclosure.

FIG. 11 is a flowchart of a method or process 380 for presenting output representative data based on virtual positionings in the virtual coordinate system 312. At block 382, the processing system 62 may receive input sensory data, such as from the sensor(s) 78, which may include a sensor disposed in the industrial automation system 72. At block 384, the processing system 62 may determine a virtual positioning of a user within the virtual coordinate system 312, which corresponds to the industrial automation system 72. As an example, the user may initially map into a starting or initial virtual positioning in the virtual coordinate system 312 using the extended reality device 52. The processing system 62 may also determine adjustment of the virtual positioning within the virtual coordinate system 312. In some embodiments, the processing system 62 may determine adjustment of the virtual positioning based on positioning or movement data received from the extended reality device 52. That is, the processing system 62 may determine physical movement of the extended reality device 52 and determine corresponding virtual movement of the virtual positioning in the virtual coordinate system 312. In additional embodiments, the processing system 62 may receive a user input indicative of the adjustment of the virtual positioning. The processing system 62 may therefore determine adjustment of the virtual positioning based on the user input.

At block 386, the processing system 62 may determine the virtual positioning of the user relative to the virtual positionings associated with other entities mapped into the virtual coordinate system 312, such as by comparing multiple virtual positionings to one another within the context of the virtual coordinate system 312. The other entities may include, for example, the industrial automation system 72 (e.g., an industrial automation component 74), another user, a physical object, and so forth. At block 388, the processing system 62 may determine output information to be presented based on the received input sensory data and in accordance with the virtual positioning of the user relative to the other virtual positionings associated with the other entities. Thus, the presented output information may be location-based. In some embodiments, the output information may include output representative data that is derived based on the input sensory data (e.g., a subset of the input sensory data proximate to the virtual positioning of the user), such as operating data associated with the industrial automation system 72.

Such output information may be presented to simulate the user being physically positioned within the industrial automation system 72 and may be indicative of an environment of the industrial automation system 72, an operating parameter of the industrial automation system 72, and the like. In additional embodiments, the output information may include output representative data associated with other users mapped into the virtual coordinate system 312. For instance, the information may be specifically related to another user (e.g., to help identify the other user). In further embodiments, the output information may include feedback indicative of an interaction associated with the user. As an example, the feedback may be provided based on the virtual positioning of the user and the virtual positioning of another entity (e.g., another user, an industrial automation component 74) intersecting with one another. As another example, the feedback may be provided based on audio data associated with a different user mapped into the virtual coordinate system 312, such as an audio input provided by the other user and/or audio data received from an environment in which the other user is located. Thus, the feedback may be provided to simulate a real-world interaction made between users. At block 390, the processing system 62 may then cause the extended reality device 52 to present the output information, thereby providing information to a user based on their virtual positioning compared to other virtual positionings (e.g., of other users, of the industrial automation component 74) within the virtual coordinate system 312.

Remote Machine Control

In certain embodiments, a user may control operation of a machine within the industrial automation system 72. For instance, the user may control movement of the machine may within the industrial automation system 72. As an example, the machine may include a robot or other mechanical system, and the user may control movement of the machine to perform various actions or tasks with respect to the industrial automation system 72. It may also be desirable to provide different output representative data to facilitate the user controlling the machine, such as to guide the user to control the machine in a desirable manner.

Figure 12:
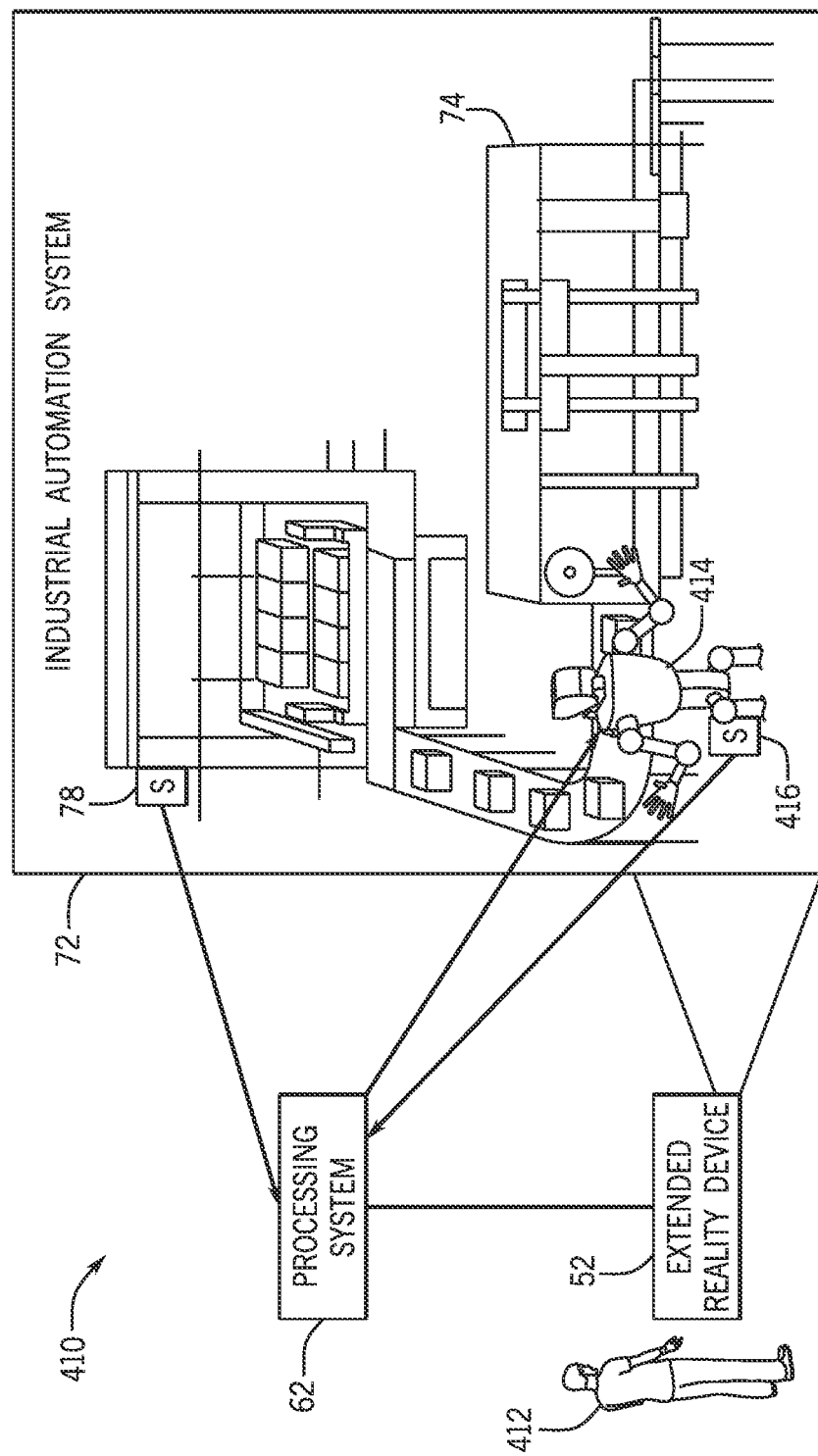
FIG. 12 is a schematic diagram of an embodiment of a communication network in which a user controls a machine in an industrial automation system, in accordance with an embodiment of the present disclosure.

FIG. 12 is a schematic diagram of an embodiment of a communication network 410 in which a user 412 may control operation of a machine 414 that is located within the industrial automation system 72. The machine 414 may perform one or more mechanical operations, such as to rotate and/or translate. Indeed, the machine 414 may include various components (e.g., limbs) that are movable relative to one another, such as to move the machine 414 between locations within the industrial automation system 72, to adjust orientations, to interact with an industrial automation component 74, and so forth. As an example, the machine 414 may include a robot, electro-mechanical equipment, and the like. The user 412 may control the machine 414 from a different location relative to the location of the machine 414. For instance, the user 412 may be a remote user 82 located remotely relative to the industrial automation system 72 and the machine 414. Thus, the remote user 82 may control the machine 414 from a remote environment. Additionally, the user 412 may be a local user 70 located within the industrial automation system 72, and the user 412 and the machine 414 may be at different locations within the industrial automation system 72.

Movement of the machine 414 may be enabled via actuators (e.g., a linear actuator, rotary actuator, motor). The user 412 may transmit a user input that is indicative of a request to move the machine 414. The user input may cause activation of the actuators and subsequent movement of the components to perform various actions and operations, such as to change orientation with respect to the industrial automation system 72, to navigate through different locations within the industrial automation system 72, to contact an industrial automation component 74 of the industrial automation system 72, and the like. In certain embodiments, the processing system 62 may be used to instruct the actuators to move the machine 414. By way of example, the user 412 may utilize the extended reality device 52 to control the machine 414. Indeed, the user 412 may transmit a user input to the extended reality device 52 to indicate a request to move the machine 414, the processing system 62 may receive the user input via the extended reality device 52, and the processing system 62 may send a command to the machine 414 based on the user input to move the machine 414 via the actuators. In additional embodiments, the user 412 may control the machine 414 in a different manner, such as by utilizing a processing system separate from the processing system 62 in order to move the machine 414.

In an example embodiments, the processing system 62 may determine movement, such as a gesture, made by the user 412 and cause corresponding movement of the machine 414. For instance, the processing system 62 may identify a change in location, orientation, and/or pose of the user 412, and cause a corresponding change in location, orientation, and/or pose of the machine 414. Thus, the processing system 62 may cause the machine 414 to mimic movement of the user 412. By way of example, the processing system 62 may determine that the user 412 has physically moved a first distance in a first direction, and the processing system 62 may cause the machine 414 to move a second distance corresponding to the first distance and in a second direction corresponding to the first direction. Indeed, the user 412 may utilize a suitable amount of space available within the physical environment of the user 412 (e.g., instead of machinery confined to a particular physical location and having mechanical movement limits) to control the machine 414, thereby enabling the user 412 to control the machine 414 more desirably and/or acutely.

The processing system 62 may cause the extended reality device 52 to present output representative data based on the positioning (e.g., position, location, orientation) of the machine 414 within the industrial automation system 72. In some embodiments, the processing system 62 may determine output representative data based on input sensory data associated with the industrial automation system 72 (e.g., received via the sensor(s) 78). For example, the processing system 62 may determine the positioning of the machine 414 within the industrial automation system 72, identify a subset of input sensory data associated with a portion of the industrial automation system 72 proximate to the positioning of the machine 414 (e.g., input sensory data associated with an industrial automation component 74 proximate to the machine 414), determine output representative data corresponding to the subset of the input sensory data, and transmit the output representative data to the extended reality device 52 for presentation. In this manner, the processing system 62 may provide the user 412 with information corresponding with data that may be available at the positioning of the machine 414 in order to simulate the user 412 being physically at the positioning of the machine 414.

Indeed, the output representative data, such as image data representing a viewing perspective of the machine 414 at the positioning within the industrial automation system 72, image data that includes a visualization of the machine 414 within the industrial automation system 72, audio data that includes sounds that are audible at the positioning within the industrial automation system 72, information regarding an operating status or operating condition associated with the industrial automation system 72 (e.g., the industrial automation component 74) at the positioning of the machine 414 within the industrial automation system 72, and the like, may guide the user 412 to determine control of the machine 414. The output representative data may, for instance, guide the user 412 to control the machine 414 to perform a particular action or task (e.g., my mimicking the movement of the user 412) with respect to the industrial automation system 72, such as to inspect the industrial automation component 74. As an example, the processing system 62 may cause the extended reality device 52 to present a virtual representation of a physical object (e.g., the industrial automation component 74) that is proximate to the machine 414. The user 412 may perform a movement with respect to the virtual representation of the physical object (e.g., virtually grasping the industrial automation component 74). Based on the movement performed by the user 412, the processing system 62 may cause the machine 414 to perform a corresponding movement (e.g., physically grasping the industrial automation component 74) that may facilitate performing a task desired by the user 412.

In additional embodiments, the output representative data may be based on input sensory data associated with the machine 414, such as input sensory data received via one or more sensors 416 disposed on the machine 414. As an example, the information may be indicative of an operating parameter associated with an environment of the industrial automation system 72, such as a temperature, humidity, atmospheric pressure, wind speed, and so forth, as detected by the sensor(s) 416. Presentation of such output representative data may help simulate the user being at the positioning of the machine 414 within the industrial automation system 72. For instance, the sensor(s) 78 and/or the sensor(s) 416 may include a temperature sensor that determines a temperature within the industrial automation system 72. The processing system 62 may cause the extended reality device 52 to output haptic feedback based on data received from the temperature sensor and in accordance with the positioning of the machine 414 within the industrial automation system 72. The haptic feedback may, as an example, include heat that is at a temperature level corresponding to a temperature value determined by the temperature sensor. That is, the processing system 62 may cause the extended reality device 52 to output heat at a first temperature level based on a first determined temperature and to output heat at a second temperature level based on a second determined temperature, the second temperature level being greater than the first temperature level and the second determined temperature being greater than the first determined temperature. Additionally, the processing system 62 may cause the extended reality device 52 to output other feedback based on the temperature value determined by the temperature sensor, such as a different type of haptic feedback (e.g., a vibration), a visual output (e.g., text indicating the measured temperature), an audio output (e.g., a sound indicating the measured temperature), and so forth. The processing system 62 may similarly cause the extended reality device 52 to present other output representative data (e.g., image data) based on other operating parameters associated with the environment of the industrial automation system 72 to provide environmental conditions sensed by the machine 414 in the industrial automation system 72.

Moreover, the processing system 62 may cause the extended reality device 52 to present additional feedback based on a determination that one of the operating parameters (e.g., a temperature value) associated with the environment of the industrial automation system 72 is outside of a range of predetermined values (e.g., a range of temperature values). By way of example, the operating parameter being outside of the range of predetermined values may indicate that the environmental condition may be imparting an undesirable amount of stress (e.g., high amount of heat) onto the machine 414. For instance, in response to determining the temperature value exceeds the range of temperature values, the processing system 62 may cause the extended reality device 52 to present vibration in addition to heat output. Thus, the additional feedback may guide the user 412 to control the machine 414 to navigate to a different location in the industrial automation system 72 where the environmental condition does not impart the undesirable amount of stress onto the machine 414.

As a further example, the processing system 62 may cause the extended reality device 52 to present feedback associated with active movement or motion of the machine 414. For instance, the output representative data may be indicative of activation of the actuators and/or movement of the components of the machine 414 relative to one another. Such output representative data may provide the user 412 with simulation of movement within the industrial automation system 72 and further simulate positioning within the industrial automation system 72. Such output representative data may include haptic feedback, such as vibration, heat, applied pressure, for example. In some embodiments, the extended reality device 52 may include a first plurality of components that may each provide haptic feedback. Each component of the first plurality of components may be associated with a corresponding component of the second plurality of components of the machine 414. In such embodiments, the processing system 62 may determine movement of a first component of the second plurality of components of the machine 414, identify a second, associated component of the first plurality of components of the extended reality device 52 based on the first component, and instruct the extended reality device 52 to cause the second component to provide haptic feedback. By way of example, the first component may correspond to an arm of the machine 414 (e.g., an arm of a robot), and the second component may be located at an arm of the user 412. However, the first plurality of components may provide haptic feedback to any suitable body part, such as the face (e.g., the nose, mouth), a leg, a hand, the torso, and so forth, of the user 412. In additional embodiments, the first plurality of components may also provide any other suitable location-based feedback, such as a visual and/or audio output, in accordance with the movement of the second plurality of components of the machine 414. In this manner, the processing system 62 may cause feedback to be selectively provided and better simulate movement of the machine 414.

The feedback associated with active movement or motion of the machine 414 may also indicate to the user 412 whether the movement of the machine 414 is desirable. As an example, the processing system 62 may determine a value associated with movement of the machine 414 (e.g., movement of the plurality of components of the machine 414), such as a force imparted onto the machine 414, a torque output by the machine 414, an angle formed between certain components of the machine 414, a movement speed of a component of the machine 414, or any combination thereof. In response to determining the value is above a threshold movement value, which may indicate that the movement of the machine 414 is imparting an undesirable amount of stress onto the machine 414, the processing system 62 may instruct the extended reality device 52 to present feedback, such as a notification, to the user 412. The feedback may cause the user 412 to adjust movement of the machine 414 (e.g., such that the value is below the threshold movement value) to avoid imparting additional stress onto the machine 414. Additionally, the processing system 62 may send a command to cause movement of the machine 414 in response to determining the value is above the threshold movement value. That is, the processing system 62 may automatically cause movement of the machine 414 to avoid excessive stress from being imparted onto the machine 414. In an example, a user input may cause first movement of the machine 414 that results in the value being above the threshold movement value, and the processing system 62 may cause second movement of the machine 414 that overrides the first movement of the machine to reduce the value below the threshold movement value.

The processing system 62 may further cause the extended reality device 52 to provide other information, such as feedback regarding actions performed by the machine 414. For example, the processing system 62 may monitor an interaction between the machine 414 and the industrial automation system 72, such as a contact between the machine 414 and an industrial automation component 74, and provide feedback based on the interaction. The feedback may, for instance, be indicative of whether the interaction is desirable (e.g., whether the interaction matches a target interaction) and/or may guide the user 412 to control the machine 414 to perform a desirable interaction. Thus, the processing system 62 may transmit the feedback to facilitate the user 412 controlling the machine 414.

Figure 13:
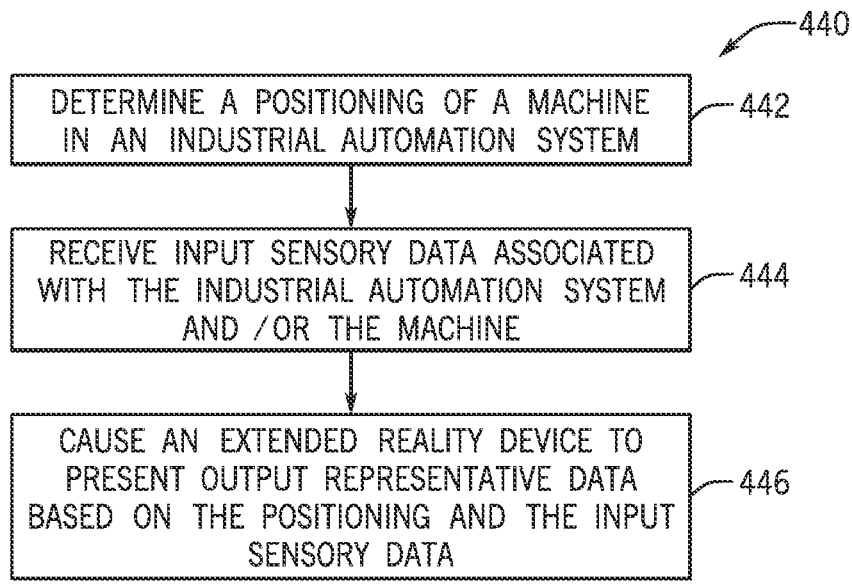
FIG. 13 is a flowchart of a method or process for presenting output representative data based on a positioning of a machine in an industrial automation system, in accordance with an embodiment of the present disclosure.

FIG. 13 is a flowchart of a method or process 440 for presenting output representative data based on a positioning of the machine 414 in the industrial automation system 72. At block 442, the processing system 62 may determine the positioning of the machine 414 in the industrial automation system 72. In some embodiments, the processing system 62 may determine the positioning of the machine 414 based on sensor data received from the sensor(s) 416 of the machine 414 and/or the sensor(s) 78 of the industrial automation system 72, such as a position sensor, an accelerometer, an imaging sensor, a distance sensor, and the like. In additional embodiments, the processing system 62 may determine the positioning of the machine 414 via the extended reality device 52, such as via a user input by the user 412. In further embodiments, the processing system 62 may determine the positioning of the machine 414 with reference to a virtual coordinate system (e.g., the virtual coordinate system 312). For instance, the processing system 62 may determine a virtual positioning of the machine 414 relative to a virtual positioning of the industrial automation system 72 based on detected movement of the machine 414.

At block 444, the processing system 62 may receive input sensory data associated with the industrial automation system 72 and/or the machine 414. That is, such input sensory data may be received via the sensor(s) 78 and/or the sensor (s) 416. As an example, the input sensory data may be indicative of operating information associated with the industrial automation system 72, an environment of the industrial automation system 72, movement data associated with the machine 414, and the like.

At block 446, the processing system 62 may cause the extended reality device 52 to present output representative data based on the received input sensory data and in accordance with the positioning of the machine 414 in the industrial automation system 72. The output representative data may help the user 412 determine an appropriate manner in which the machine 414 is to be controlled, such as to transmit a user input (e.g., via the extended reality device 52) that adjusts a movement of the machine 414.

In certain embodiments, the output representative data may be presented to simulate information observable at the positioning of the machine 414. As an example, the processing system 62 may identify a subset of the received input sensory data corresponding to the positioning of the machine 414 (e.g., using sensor data received from a subset of the sensor(s) 78 that are within a threshold distance of the positioning of the machine 414). The processing system 62 may cause the extended reality device 52 to present output representative data based on the subset of the received input sensory data. In response to a determined update to the positioning of the machine 414, the processing system 62 may identify a different subset of the received input sensory data and cause the extended reality device 52 to present updated output representative data based on the different subset of the received input sensory data. In an example, the processing system 62 may present output representative data that includes information associated with an industrial automation component 74 having a positioning corresponding to the positioning of the machine 414 (e.g., the industrial automation component 74 is within a threshold distance of the machine 414, the industrial automation component 74 is within a field of view of the machine 414). In another example, the processing system 62 may present output representative data that includes information corresponding to an environment associated with the positioning of the machine 414. The output representative data provided to the user 412 may enable the user 412 to determine appropriate control of the machine 414, such as movement control within the industrial automation system 72.

Furthermore, the processing system 62 may be configured to compare the input sensory data to respective threshold values and/or ranges of values and cause the extended reality device 52 to present the output representative data based on the comparison. As an example, in response to a determination that an operating parameter value corresponding to an environmental condition (e.g., a temperature) associated with the positioning of the machine 414 is outside of a range of values, the processing system 62 may cause the extended reality device 52 to output a notification to move or re-locate the machine 414 to a different location in the industrial automation system 72. As another example, in response to a determination that operating data or condition (e.g., vibration, temperature) of a nearby industrial automation component 74 is outside of a threshold range of values, the processing system 62 may cause the extended reality device 52 to output a notification regarding the industrial automation component 74, such as that a maintenance operation (e.g., an inspection, a replacement) is to be performed on the industrial automation component 74.

In additional embodiments, the output representative data may be presented to indicate an active movement or motion of the machine 414. As an example, the output representative data may simulate movement of the machine 414 to the user 412, such as by providing spatial haptic feedback to the user 412 corresponding to detected movement of components of the machine 414. Thus, the processing system 62 may provide the user 412 with a more interactive or realistic experience when controlling the machine 414. As another example, the processing system 62 may present the output representative data to block movement that would cause excessive stress to be imparted onto the machine 414 (e.g., on an actuator, on a motor). For instance, the input sensory data may be indicative of a movement value of the machine 414 (e.g., an angle of rotation, a torque output, a force output, an imparted force, a speed of movement) and, in response to determining that the movement value is greater than a threshold movement value, the processing system 62 may present the output representative data to guide the user to adjust movement of the machine 414, such as to guide the user 412 adjust the movement of the machine 414. As such, the processing system 62 may output the representative data to block excessive stress from being imparted onto the machine 414.

Figure 14:
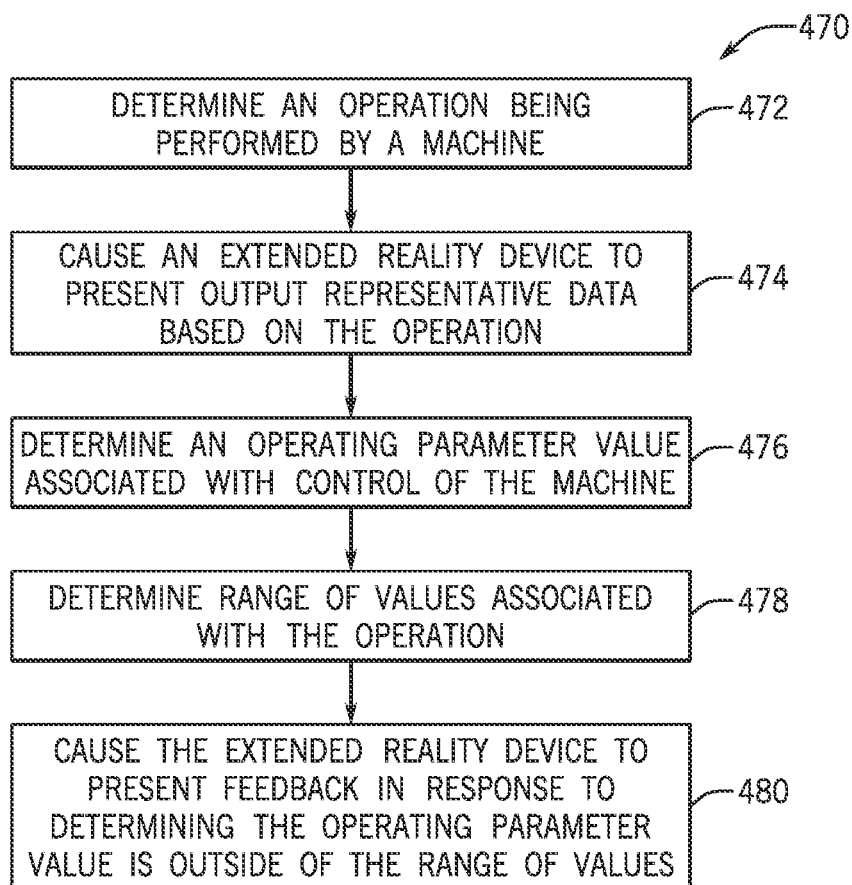
FIG. 14 is a flowchart of a method or process for presenting feedback based on an operation being performed by a machine, in accordance with an embodiment of the present disclosure.

FIG. 14 is a flowchart of a method or process for presenting feedback based on an operation being performed by the machine 414 with respect to the industrial automation system 72. At block 472, the processing system 62 may determine the operation being performed by the machine 414. The operation may, for example, include an interaction between the machine 414 and the industrial automation component 74 and may be selected from a plurality of possible operations that the machine 414 may perform. For instance, the processing system 62 may determine the operation being performed by the machine 414 via a user input. Additionally, the processing system 62 may determine the operation (e.g., a maintenance operation, a relocation operation) being performed by the machine 414 (e.g., by selecting the operation from the plurality of possible operations) based on data received from the sensor(s) 78 (e.g., the sensor(s) 78 disposed on the industrial automation component 74) and/or the sensor(s) 416, such as data indicative of a status (e.g., an operating condition, diagnostic information) of the industrial automation component 74 along with data indicative that the location of the machine 414 is within a threshold distance of the industrial automation component 74, the industrial automation component 74 is within a field of view of the machine 414, or that a first location of the machine 414 corresponds to a second location of the industrial automation component 74. In some embodiments, a user input, such as a request to move the machine 414, may control the machine 414 to perform the operation.

At block 474, the processing system 62 may cause the extended reality device 52 to present output representative data based on the operation using any of the techniques described herein. Such output representative data may correspond to input sensory associated with the positioning of the machine 414 in the industrial automation system 72 and/or associated with the industrial automation component 74. Indeed, in response to determining the operation includes an interaction between the machine 414 and the industrial automation component 74, the processing system 62 may identify information associated with the industrial automation component 74 and transmit the information to the extended reality device 52 for presentation. The presented output representative data may facilitate control of the machine 414 via user input to perform the operation.

At block 476, the processing system 62 may determine an operating parameter value associated with the control of the machine 414. The operating parameter value may be indicative of the movement of the machine 414 as controlled by a user input. For instance, the operating parameter value may include a force imparted onto the machine 414, a force imparted by the machine 414, a torque output by the machine 414, an angle formed between components of the machine 414, a movement speed of a component of the machine 414, another suitable operating parameter value, or any combination thereof.

At block 478, the processing system 62 may determine a range of values associated with the operation. The range of values may be indicative of a desirable performance of the operation. By way of example, each operation of the plurality of possible operations may be associated with a respective range of values, and the processing system 62 may determine the range of values associated with the determined operation. The processing system 62 may compare the operating parameter value associated with the control of the machine and the range of values associated with the operation to one another to determine whether the control of the machine 414 is causing the operation to be performed as desired.

At block 480, the processing system 62 may cause the extended reality device 52 to provide feedback in response to a determination that the operating parameter value is outside of the range of values. In certain embodiments, the feedback may include visual instructions, audio instructions, haptic feedback, or other suitable information to indicate that the control of the machine 414 is to be adjusted (e.g., such that the operating parameter value associated with the interaction is within the threshold range of values). Thus, the processing system 62 may guide the user 412 to control the machine 414 more desirably, such as in subsequent operations. In additional embodiments, the processing system 62 may automatically adjust the machine 414. That is, the processing system 62 may override the control caused by a user input in response to determining the operating parameter value is outside of the range of values, such as to avoid excessive stress from being imparted onto the machine 414 and/or the industrial automation component 74. For example, the processing system 62 may send a command to the machine 414 to block movement caused by the user input in response to determining the operating parameter value is outside of the range of values.

In one example, the processing system 62 may determine that the operation includes a force being applied by the machine 414 to contact the industrial automation component 74 (e.g., to actuate a component of the industrial automation component 74), such as to press a button, move a switch, turn a dial, and so forth. The processing system 62 may cause the extended reality device 52 to present output representative data regarding the industrial automation system 72, the industrial automation component 74, and/or the operation in response to determination of the operation. The processing system 62 may also cause the extended reality device 52 to present feedback based on the force being applied by the machine 414. Such feedback may include, for instance, haptic feedback (e.g., a vibration) to simulate a user performing the operation. Indeed, the processing system may adjust the feedback based on the amount of force being applied, such as by providing a feedback of a higher intensity for a higher amount of force being applied.

Additionally, there may be a range of force values associated with the operation, such as to enable an adequate amount of force to perform the operation. Thus, the processing system 62 may determine whether the force being applied by the machine 414 is within the range of force values. In response to a determination that the force is below the range of force values (e.g., indicative that the component of the industrial automation component 74 is not being adequately actuated by the force applied by the machine 414), the processing system 62 may cause the extended reality device 52 to present feedback (e.g., instructions) that informs the user 412 to control the machine 414 to impart a greater force. Additionally, the processing system 62 may directly cause the machine 414 to impart a greater force. In response to a determination that the force is above the range of threshold force values (e.g., indicative that an undesirable amount of stress may be imparted onto the component by the machine 414), the processing system 62 may cause the extended reality device 52 to present feedback that informs the user 412 to control the machine 414 to impart a reduced force. Additionally, the processing system 62 may directly cause the machine 414 to impart a reduced force. In this manner, the processing system 62 may facilitate operation of the machine 414 to apply a desirable or target force.

In another example, the processing system 62 may determine that the operation includes movement of the industrial automation component 74 caused by the machine 414, such as to push, pull, turn, rotate, carry, and so forth, the industrial automation component 74. In this example, the processing system 62 may determine a current positioning of the industrial automation component 74. Furthermore, there may be a range of positioning values (e.g., an angle of rotation, a location coordinate) associated with the operation. The processing system 62 may compare the positioning of the industrial automation component 74 with the range of positioning values, and the processing system 62 may provide feedback to guide movement of industrial automation component 74 such that the positioning is within the range of positioning values. For example, the processing system 62 may output visual instructions, audio data (e.g., spatial audio feedback), haptic feedback (e.g., spatial vibrations) indicative of the positioning relative to the range of positioning values. Thus, the feedback may facilitate operation to move the industrial automation component 74 in a desirable manner via the machine 414.

Time-Based User Experiences

Returning to FIG. 1, the processing system 62 may enable users to be trained or other user experiences to be provided using collected data (e.g., input data 76, output data, 80, output data 84, input data 88). Indeed, as discussed below, user experiences may be generated based on or using the collected data to provide the user an immersive experience that relates to the past, the present (e.g., real-time or substantially real-time), or the future conditions of a monitored environment. That is, based on the collected data, the processing system 62 may generate output representative data (as discussed above) that corresponds to a particular period of time that occurred in the past, that is presently occurring, or is that predicted to occur in the future. The user experiences may be provided to local or remote users, for example, to train the users (e.g., based on previous data), to manage current operations (e.g., based on current data), or predict a state of the monitored equipment (e.g., based on an analysis of the past and current data). During the user experiences, output representative data (as discussed above) may be provided to one or more electronic devices utilized by the user, such that the user may physically experience the conditions that are present at the industrial automation system 72.

Before discussing the user experiences that may be facilitated by the processing system 62, it should be noted that data received by the processing system 62 (e.g., input data 76, output data, 80, output data 84, input data 88) may be stored in the database 68. Additionally, the processing system 62 (e.g., via processing circuitry 112 of FIG. 2) may execute computer-executable instructions to perform the techniques described herein. For example, a user such as the local user 70 or remote user 82 may access or interact with user experiences that the processing system 62 provides. More specifically, the processing system 62 may execute computer-readable instructions to run a computer program (e.g., software) that the local user 70 and remote user 82 may interact with, and the processing system 62 may provide user experiences based on user inputs made by the local user 70 and remote user 82. For instance, a user may provide a user input to browse a library of available user experiences (e.g., particular past experiences, present experiences, and future experiences) and to select a particular experience. In response, the processing system 62 may provide the selected user experience to the user, thereby providing a fully immersive experience that may enable the user to experience events that have occurred, are currently occurring, or that could occur in the future.

Figure 15:
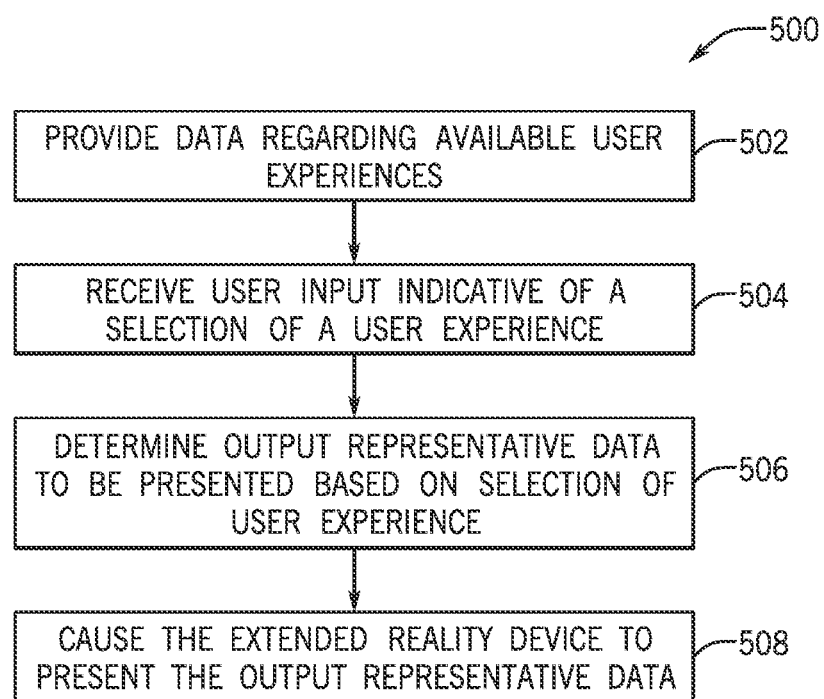
FIG. 15 is a flowchart of a method or processor for providing a time-based user experience, in accordance with an embodiment of the present disclosure.

Bearing this in mind, FIG. 15 is a flowchart of a method 500 for providing a time-based user experience. The method 500 may be performed by the processing system 62 by executing computer-readable instructions that may be stored on a computer-readable medium such as non-transitory computer-readable medium. Although the method 500 is described as being performed in a particular order, it should be noted that the method 500 may be performed in any suitable order. Moreover, although the method 500 is described as being performed by the processing system 62, the method 500 may be performed by any suitable computing device.

At block 502, the processing system 62 may provide data regarding available user experiences to one or more electronic devices utilized by a user such as, but not limited to, the extended reality device 52 or an electronic device that is communicatively coupled to the extended reality device 52. More specifically, the processing system 62 may categorize or otherwise arrange collected data (e.g., previously obtained input data 76, output data, 80, output data 84, and input data 88 or current input data 76, output data, 80, output data 84, or input data 88) into collections or particular user experiences. For example, as described above, the processing system 62 may store the input data (e.g., received input data, categorized input data) and/or corresponding output data in the database 68, and the processing system 62 may associate the input data and/or the output data with an identifier, such as an event (e.g., a maintenance event).

The processing system 62 may provide data regarding available user experiences by indicating events for which a tag or identifier exists. For example, the user experiences may indicate past events and events currently taking place (or that have very recently occurred). More specifically, past events may include a particular occurrence (e.g., a maintenance operation, repair operation, installation operation, inspection operation, or other task performed by someone in an automation system (e.g., local user 70) or a remote user (e.g., remote user 82). Present events may include a task or activity for which data is currently being provided to the processing system 62 or database 68 (e.g., data received from an extended reality device 52 utilized by the local user 70, the remote user 82, or both). Present events may be defined with respect to a particular user. The user experiences may also indicate one or more future events that, as described below, may be generated based on collected data. In response to receiving the data regarding available user experiences, the extended reality device 52 or an electronic device communicatively coupled to the extended reality device 52 may display a graphical user interface that visually (or otherwise) indicates the user experiences available to the user. For instance, in addition to a graphical user interface, the extended reality device 52 may convey the user experiences available to the user audibly. Moreover, the graphical user interface provided may be provided as an overlay in front of a real world setting (e.g., in the case of providing augmented reality content). It should also be noted that, in some embodiments, the processing system 62 may not perform the operations associated with block 502, block 504 (discussed below), or both in response to determining the user's intent. For example, the processing system 62 may determine an experience the user may want to use based on information about the user (e.g., user profile information) and the user's past actions. In such a case, the processing system 62 may provide output representative data associated with the experience to the extended reality device 52 in lieu of providing data regarding available user experiences, receiving user input indicative of a selection of a user experience, or both.

In some embodiments, the data regarding available user experiences may be provided based on input received by the processing system 62. That is, the processing system 62 may receive inputs from a menu system or a search field that allows a user to navigate through the available user experiences. In some embodiments, the processing system 62 may group experiences based on whether the experience is related to a past event, a current operation status, or a future expected state. After receiving the input to specify a type of user experience (e.g., past, present, future), the processing system 62 may present a list of available user experiences that have been previously captured, can be generated in real time based on contemporaneously acquired sensor data, or predicted for future states based on collected data and identified trends.

At block 504, the processing system 62 may receive a user input indicative of a selection of a particular user experience of the listed user experiences. For instance, the user may make such an input using the extended reality device 52, an electronic device communicatively coupled to the extended reality device 52, or a combination thereof to select a user experience included in the graphical user interface mentioned above. It should be noted that the user input may also be provided verbally. For example, a user may verbally request certain content, and in response to receiving such a request, the processing system 62 may determine output representative data (as discussed below) indicated by the request. Furthermore, it should be noted that, in some embodiments, the user input may also include a user intent (e.g., an implied input) that the processing system 62 may derive from contextual information for the user. For example, in response to detecting the user complain about, or a noise indicative of the user's dissatisfaction, the processing system 62 may determine a user experience (or output representative data associated with an experience) to address the user's complaint or dissatisfaction.

At block 506, the processing system 62 may determine output representative data to be presented on the extended reality device 52 (or an electronic device communicatively coupled to the extended reality device 52 or both) based on the user selection of a user experience. In other words, the processing system 62 may determine the user experience indicated by the user input and determine output representative data to be provided to enable the user to experience the selected user experience. For instance, as noted above, the processing system 62 may associate the input data and/or the output data with an identifier, such as an event (e.g., a maintenance event). Based on a user input indicative of a request to select a user experience that is associated with the identifier, such as to simulate the event, the processing system 62 may retrieve the input data and/or the output data associated with the identifier to cause the user to be experience a user experience (e.g., via the output representative data being presented on the extended reality device 52).

For example, in the case of a user experience dealing with a past event, output representative data may include information included in the input sensory datasets previously received and stored in the database 68. The processing system 62 may determine a quantity or amount of such information to be presented via the output representative data. That is, the processing system 62 may determine which information (e.g., information associated with the user, information associated with the industrial automation system 72) is to be presented. The processing system 62 may additionally determine a format in which the output representative data is to be presented. For instance, the processing system 62 may determine whether different information or data is to be presented via image data, text, audio data, haptic feedback, another suitable format, or any combination thereof. For example, the processing system 62 may recreate a previously occurring event such that the user may experience the same (or a nearly identical) experience in an augmented or virtual reality setting as experienced by a user associated with the input data (e.g., input data 76) that serves as the basis for the user experience. In other words, a user may "relive" an event as the event occurred via image data, text (which could characterize or indicate any form of data received by the sensor(s) 78), audio data, haptic feedback that will be provided to the extended reality device 52. As such, the processing system 62 may generate a user experience in which a user experiences an event as the event as indicated by data originally collected during that event. In this way, the processing system 62 may present a more immersive environment to simulate different situations associated with the industrial automation system 72 without having to change a real-world status of the industrial automation system 72.

As another example, the output representative data may include information originally sent as output representative data to a different user during the original event's occurrence. For example, during a user experience in which a user experienced a past event, the processing system 62 may identify output data that was originally provided to another user other than the user who originally experienced the event. For instance, in the case in which a user is to observe an event that occurred in the industrial automation system 72 from the lens or viewpoint of how the remote user 82 experienced the event, the processing system 62 may determine the output representative data by determining the output data 84 previously provided to the remote user 82, generating output representative data based on the output data 84, or both. Furthermore, in some embodiments, the output representative data determined at block 506 may include the input data 88 originally generated by equipment of the remote user 82 or data generated based off of the input data 88 or sensor data collected by the sensor(s) 78.

Similarly, for a user experience that is generated based on the present (e.g., a presently occurring event or operation involving a local user or remote user), the processing system 62 may identify data received from an extended reality device 52 of the local user 70, one or more remote users 82, or both. The processing system 62 may also identify the first output data 80, the output data 84 provided to the extended reality device 52 of the local user 70, remote user(s) 82, or both. The identified data (e.g., whether input data, output data, or some combination thereof) may then be included in the output representative data that is determined at block 506. Such output representative data may also include data that is determined based on data collected by the sensor(s) 78. As such, a user may experience a presently occurring event as the event occurs in real-time or in near real-time as though the user were experiencing the event firsthand.

For future user experiences occurring in the future, the processing system 62 may determine output representative data based on previously collected data (e.g., input data received from extended reality devices 52 and the sensor(s) 78). The determined output representative data may be utilized, for example, to provide the user a simulation of events that could occur (e.g., in the industrial automation system 72) from the perspective of a local user or a remote user in light of the current conditions of the system, current equipment employed by the system, the previous wear that the equipment has already experienced, the expected stress and operational use of the equipment in the future, and the like. More particularly, returning briefly to FIG. 1, the processing system 62 (or the processing circuitry 112) may perform machine learning (e.g., based on a training model), perform simulations, or both utilizing data collected in the database 68 (e.g., input data 76, output data, 80, output data 84, input data 88) to determine output representative data that will be used to provide a future, or predictive, user experience. For example, the processing system 62 may execute computer-readable instructions to perform machine-learning, simulate the operation of one or more components of the industrial automation system 72, or both to determine the output representative data. Thus, the user may be placed (e.g., using virtual reality or augmented reality) within a simulation of the industrial automation system 72 that the processing system 62 generates based on previously collected data.

Returning to FIG. 15 and the discussion of the method 500, at block 508, the processing system 62 may cause the extended reality device 52 to present the output representative data determined at block 506. That is, in response to determining the output representative data to be presented, the processing system 62 may cause the extended reality device 52 to present such output representative data. In other embodiments, the processing system 62 may provide the output representative data to the extended reality device 52, and the extended reality device 52 may cause the output representative data to be presented (e.g., via the display 120). The output representative data may include, but is not limited to, visual data, audio data, haptic data, gustatory data (e.g., a taste or flavor), and/or olfactory data associated with an environment, location data associated with a device (e.g., a component of the industrial automation system 72), and biometric data associated with one or more users.

In this manner, the processing circuitry may output representative data and cause the extended reality device 52 to present the retrieved input data and/or output data to a user, thereby simulating a previous, current, or potentially future status of the industrial automation system 72. The processing circuitry may also adjust or adapt user experiences (i.e., determine new output representative data and provide the new output representative data) based on additional input received from the extended reality device 52, sensor(s) 78, or both. For example, the processing system 62 may process historical input data to simulate similar or related situations (e.g., to be interacted with in the context of a past event or as the basis for a future event to be experienced). After providing corresponding output representative data to the extended reality device 52, the processing system 62 may receive input data from the extended reality device 52 associated with a first operational status (e.g., during a first operational mode of the industrial automation component 74) of the industrial automation system 72, such as a status that caused a maintenance task or operation to be performed. In response, the processing system 62 may determine output data to be presented based on such input data and associate the output data with the first operational status of the industrial automation system 72.

At a later time, the processing system 62 may simulate the first operational status of the industrial automation system 72, such as to train a remote user 82 to perform the maintenance ask, by presenting the stored output data associated with the first operational status of the industrial automation system 72. Accordingly, while a user may select to experience a past or current event, the processing system 62 may simulate a potential future event by determining and providing additional output representative data based on inputs received from the extended reality device 52. In other words, as a user interacts with output representative data (e.g., participate in a virtual or augmented reality experience), the output representative data may be updated in response to, and based on, the user's interactions. The processing system 62 may also be used for applications other than training. For instance, the first operational status (or any past, current, of future status) of the industrial automation system 72 (or a component thereof) may be simulated to investigate an event or incident within the industrial automation system to determine the cause (or a potential cause) of the incident. The event or incident may include, but is not limited to, a variety of situations, such as a breakdown or other interruption to the operation of the industrial operation system 72 (or a component thereof). As another example, the processing system 62 may determine (and cause to be presented) output representative data to enable a user to review procedures within the industrial automation system 72. The procedures may include the general operation or maintenance of the industrial automation system 72 as well as the components thereof. The procedures may also relate to users or people (e.g., technicians) within the industrial automation system 72, such as how the technicians operate equipment in the industrial automation system 72 or respond to events within the industrial automation system 72.

The method 500 may be performed in conjunction with the techniques described above with respect to FIGS. 3-14. As a nonlimiting example, after performing operations associated with block 508, the processing system 62 may provide or adjust additional output representative data based on an intent predicted by the processing system or user feedback made using the extended reality device 52. As such, in other embodiments, the method 500 may include any operation or combination of operations included in the methods 140, 170, 200, 230, 260, 380, 440, 470.

Furthermore, it should be noted that the output representative data generated while performing the method 500 may be modified based on a user's (past or present) interaction with output representative data, information about the user, information about the industrial automation system 72, or any combination thereof, thereby enabling the generation and editing of simulation content. For example, when performing a simulation for a user, the processing system 62 may utilize information about the user (e.g., based on a profile for the user, a role of the user, and past activities of the user) to generate output representative data specific to that user. As a more specific example, in the case of a simulation for a repair to a component of the industrial automation system 72, the processing system 62 may determine that a first user has not performed the repair recently (e.g., more than a threshold amount of time has passed since the user last made a similar type of repair), that the first user is relatively inexperienced (e.g., based on an amount of experience indicated by the first user's profile being less than a threshold amount of time), or both. In response to such a determination, the processing system may generate output representative data that includes elements (e.g., a QR code or other visual representations) that the user can interact with to access a manual associated with performing the repair, a service record of the component, a video tutorial for performing the repair, or a combination thereof.

As another example, for a relatively more experienced second user who has more recently completed the repair, the processing system 62 may include fewer elements in the output representative data. For instance, if the first user were presented with elements for the manual, service record, and video tutorial, the processing system 62 may include the elements for the manual and the service record because the second user did not access the video tutorial when last performing the repair. The processing system 62 may monitor how a user interacts with the output representative data. Continuing with the example of the second user, when performing the repair in the present, the second user may provide user input to access the service record upon being presented with the output representative data. The processing system 62 may record such an action, and when the second user subsequently performs a different repair, the output representative data may automatically include the service record. That is, the service record may be presented to the second user without the second user providing user input to display the service record.

As a further example, while interacting with the output representative data, the operator may verbally complain that instructions for the repair that are being displayed are obscuring the user's view. In response to such a cue (e.g., alone or in combination with user input, such as user input to move where the instructions are displayed), the processing system 62 may automatically generate output representative data in the future that includes in the instructions in a location acceptable to the second user. Furthermore, based on data collected from multiple users, the processing system 62 may alter baseline or default output representative data.

For example, if the processing system 62 detects that users rarely interact with the element for manuals, the processing system 62 may remove the element from the output representative data or replace the element with an element associated with other content (e.g., an element for content that the processing system 62 determines more users have accessed). As such, the processing system 62 may automatically generate and alter output representative data that is both user-specific and context-specific.

Accordingly, by performing the method 500, the processing system 62 enables users to experience fully immersive scenarios (e.g., simulations involving using virtual reality, augmented reality, or both) that may be past events, current events, or events that could potentially occur at a future time. In this manner, the processing system 62 may be used for a variety of applications, such as to train technicians, engineers, or other users how to perform various tasks associated with the industrial automation system 72.

Embodiments of the present disclosure improve data presentation to a user via an extended reality device. For example, a processing system may receive input data (e.g., input sensory data) associated with an industrial automation system, categorize the input data, prioritize the categorized input data based on context information, and cause the extended reality device to present output representative data according to the priority. In particular, the processing system may prioritize the categorized input data based on a relevancy or importance of the input data, such as that determined using context information associated with the user and/or the industrial automation system. In this manner, the processing system may better assist the user perform a desired task, such as by providing sufficient information to the user without overwhelming the user. Indeed, the processing system may cause the extended reality device to present output representative data in a particular format based on the priority and the input data. As a result, the processing system may improve the manner in which various information is presented to the user, such as by presenting visual data, audio data, haptic feedback, and the like, in a more intuitive manner.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A tangible, non-transitory, computer-readable medium comprising instructions, wherein the instructions, when executed by processing circuitry, are configured to cause the processing circuitry to perform operations comprising:
receiving a plurality of sensory datasets associated with an industrial automation system from a plurality of sensors, wherein the plurality of sensors comprises an image sensor, a microphone, a haptic sensor, a movement sensor, a biometric sensor, an odor sensor, or any combination thereof;

determining context information based on a sensory dataset of the plurality of sensory datasets, wherein the context information is representative of an environmental condition associated with an extended reality device, the industrial automation system, or both;

predicting an intent of a user to complete a task associated with the industrial automation system based on the plurality of sensory datasets and the context information;

presenting first output representative data via the extended reality device based on the intent and a setting, wherein the setting comprises a first data presentation format for presenting at least a portion of the plurality of sensory datasets;

identifying incompletion of the task during presentation of the first output representative data;

presenting, in response to identifying the incompletion of the task during the presentation of the first output representative data, second output representative data via the extended reality device based on a second data presentation format, different from the first data presentation format, for presenting the at least a portion of the plurality of sensory datasets; and updating the setting to generate a modified setting based on identifying the incompletion of the task during the presentation of the first output representative data and based on historical data indicative of a plurality of users changing the first data presentation format of the first output representative data.

2. The tangible, non-transitory, computer-readable medium of claim 1, wherein the instructions, when executed by the processing circuitry, are configured to cause the processing circuitry to perform operations comprising:
receiving an additional plurality of sensory datasets associated with the industrial automation system from the plurality of sensors;
determining additional context information based on an additional sensory dataset of the additional plurality of sensory datasets;
predicting the intent of the user to complete the task based on the additional plurality of sensory datasets and the additional context information; and
presenting third output representative data via the extended reality device based on the intent and the modified setting.

3. The tangible, non-transitory, computer-readable medium of claim 1, wherein the instructions, when executed by the processing circuitry, are configured to cause the processing circuitry to perform operations comprising:
determining a number of the plurality of users indicated by the historical data; and
updating the setting to generate the modified setting based on the number exceeding a threshold number.

4. The tangible, non-transitory, computer-readable medium of claim 1, wherein the instructions, when executed by the processing circuitry, are configured to cause the processing circuitry to perform operations comprising:
receiving an additional plurality of sensory datasets associated with the industrial automation system from the plurality of sensors;
identifying completion of the task based on the additional plurality of sensory datasets;

predicting an additional intent of the user to complete an additional task in response to identifying the completion of the task; and
presenting third output representative via the extended reality device based on the additional intent and an additional setting, wherein the additional setting comprises the second data presentation format for presenting at least a portion of the additional plurality of sensory datasets.

5. The tangible, non-transitory, computer-readable medium of claim 1, wherein the instructions, when executed by the processing circuitry, are configured to cause the processing circuitry to perform operations comprising:
identifying a plurality of user profiles associated with an additional plurality of users, wherein each user profile of the plurality of user profiles comprises the setting comprising the first data presentation format; and
modifying the plurality of user profiles to update the setting of each user profile of the plurality of user profiles based on identifying the incompletion of the task during the presentation of the first output representative data and based on the historical data indicative of the plurality of users changing the first data presentation format of the first output representative data, such that each user profile comprises the modified setting.

6. The tangible, non-transitory, computer-readable medium of claim 1, wherein the instructions, when executed by the processing circuitry, are configured to cause the processing circuitry to present the second output representative data presenting at least an additional portion of the plurality of sensory datasets that was not previously presented via the first output representative data, removing presentation of part of the at least a portion of the plurality of sensory datasets that was previously presented via the first output representative data, or any combination thereof.

7. The tangible, non-transitory, computer-readable medium of claim 1, wherein the instructions, when executed by the processing circuitry, are configured to cause the processing circuitry to perform operations comprising:
selectively updating a user profile associated with the incompletion of the task such that the user profile comprises the modified setting in response to identifying the incompletion of the task during the presentation of the first output representative data;
determining a number of the plurality of users indicated by the historical data; and
maintaining a plurality of other user profiles such that each of the plurality of other user profiles comprises the setting, while selectively updating the user profile associated with the incompletion of the task, based on the number being below a threshold number and identifying the incompletion of the task during the presentation of the first output representative data.

8. The tangible, non-transitory, computer-readable medium of claim 1, wherein the instructions, when executed by the processing circuitry, are configured to cause the processing circuitry to identify the incompletion of the task during the presentation of the first output representative data based on an additional plurality of sensory datasets received from the plurality of sensors, a user input received via the extended reality device, or both.

9. The tangible, non-transitory, computer-readable medium of claim 7, wherein the instructions, when executed by the processing circuitry, are configured to cause the processing circuitry to adjust, based on the number of the plurality of users indicated by the historical data exceeding the threshold number, the plurality of other user profiles such that each of the plurality of other user profiles comprises the modified setting.

10. The tangible, non-transitory, computer-readable medium of claim 1, wherein the instructions, when executed by the processing circuitry, are configured to cause the processing circuitry to perform operations comprising:
presenting the second output representative data via the extended reality device based on an alternative setting in response to identifying the incompletion of the task during the presentation of the first output representative data, wherein the alternative setting comprises the second data presentation format for presenting at least the portion of the plurality of sensory datasets; and
updating the setting to generate the modified setting based on the alternative setting.

11. A method, comprising:
receiving, via a processor, a plurality of sensory datasets associated with an industrial automation system from a plurality of sensors, wherein the plurality of sensors comprises an image sensor, a microphone, a haptic sensor, a movement sensor, a biometric sensor, an odor sensor, or any combination thereof;
identifying, via the processor, context information based on at least one sensory dataset of the plurality of sensory datasets, wherein the context information is representative of an environmental condition surrounding the industrial automation system;
determining, via the processor, a task to be performed by a user for the industrial automation system based on the context information and the plurality of sensory datasets;
presenting, via the processor, first output representative data in a first format via a first extended reality device based on the plurality of sensory datasets and the context information;
identifying, via the processor, incompletion of the task during presentation of the first output representative data;
presenting, via the processor, second output representative data in a second format, different from the first format, via the first extended reality device based on the plurality of sensory datasets in response to identifying the incompletion of the task during the presentation of the first output representative data;
storing, via the processor, the plurality of sensory datasets, the first output representative data, the second output representative data, or both the first output representative data and the second output representative data, as training content for performing the task;
receiving, via the processor, an indication to retrieve the training content via a second extended reality device;
retrieving, via the processor, the training content in response to receiving the indication; and
presenting, via the processor, the plurality of sensory datasets, the first output representative data, the second output representative data, or both the first output representative data and the second output representative data, via the third second extended reality device in response to retrieving the training content.

12. The method of claim 11, comprising:
receiving, via the processor, a request to perform the task via the second extended reality device;
retrieving, via the processor, the training content in response to receiving the request to perform the task; and
presenting, via the processor, the plurality of sensory datasets, the first output representative data, the second output representative data, or both the first output representative data and the second output representative data, via the second extended reality device in response to retrieving the training content.

13. The method of claim 11, comprising:
receiving, via the processor, an additional plurality of sensory datasets associated with the industrial automation system from the plurality of sensors;
identifying, via the processor, additional context information based on at least one additional sensory dataset of the additional plurality of sensory datasets;
determining, via the processor, that the task is to be performed by an additional user for an additional industrial automation system based on the additional context information and the additional plurality of sensory datasets, wherein the additional user is associated with the second extended reality device;
retrieving, via the processor, the training content in response to determining that the task is to be performed; and
presenting, via the processor, the plurality of sensory datasets, the first output representative data, the second output representative data, or both the first output representative data and the second output representative data, via the second extended reality device in response to retrieving the training content.

14. The method of claim 11, comprising:
determining, via the processor, that there is no previously stored training content for performing the task; and
storing, via the processor, the plurality of sensory datasets, the first output representative data, the second output representative data, or both the first output representative data and the second output representative data, as the training content for performing the task in response to determining that there is no previously stored training content for performing the task.

15. The method of claim 11, comprising:
presenting, via the processor, the first output representative data via the first extended reality device in the first format to present at least a portion of the plurality of sensory datasets; and
presenting, via the processor, the second output representative data via the first extended reality device in the second format to present the at least a portion of the plurality of sensory datasets.

16. The method of claim 11, comprising:
receiving, via the processor, audio feedback, image feedback, or both, via the first extended reality device during the presentation of the first output representative data; and
storing, via the processor, the audio feedback, the image feedback, or both, as the training content for performing the task.

17. A processing system of an industrial automation system, the processing system comprising:
processing circuitry; and
a memory storing instructions, wherein the instructions, when executed by the processing circuitry, are configured to cause the processing circuitry to perform operations comprising:
receiving a plurality of sensory datasets associated with the industrial automation system from a plurality of sensors, wherein the plurality of sensory datasets comprises audio data, vibration data, operating speed data, temperature data, or any combination thereof;

determining a first action associated with a first maintenance operation to be performed by a user in response to a first sensory dataset being outside of a first range of values and a second sensory dataset being outside of a second range of values;

receiving context information via an extended reality device, wherein the context information is representative of an environmental condition associated with the extended reality device;

determining a first data presentation format for presenting at least a first portion of the plurality of sensory datasets based on the first action and the context information;

presenting first output representative data according to the first data presentation format via the extended reality device;

determining incompletion of the first action during presentation of the first output representative data;

determining a second action associated with a second maintenance operation, different from the first action associated with the first maintenance operation, to be performed by the user based on the plurality of sensory datasets in response to determining the incompletion of the first action during the presentation of the first output representative data;

determining a second data presentation format, different from the first data presentation format, for presenting at least a second portion of the plurality of sensory datasets based on the second action and the context information; and presenting second output representative data according to the second data presentation format via the extended reality device.

18. The processing system of claim 17, wherein the instructions, when executed by the processing circuitry, are configured to cause the processing circuitry to determine the incompletion of the first action during the presentation of the first output representative data based on an additional plurality of sensory datasets received from the plurality of sensors, a user input received via the extended reality device, or both.

19. The processing system of claim 17, wherein the instructions, when executed by the processing circuitry, are configured to cause the processing circuitry to perform operations comprising:

receiving an additional plurality of sensory datasets associated with the industrial automation system from the plurality of sensors, wherein the additional plurality of sensory datasets comprises image data, additional audio data, additional vibration data, additional operating speed data, additional temperature data, or any combination thereof;

determining that the first action associated with the first maintenance operation has been completed based on the additional plurality of sensory datasets;

determining a third action associated with the first maintenance operation in response to determining that the first action has been completed;

determining a third data presentation format for presenting at least a third portion of the additional plurality of sensory datasets based on the third action and the context information; and presenting third output representative data according to the third data presentation format via the extended reality device.

20. The processing system of claim 17, wherein the context information is indicative of a user profile comprising a preferred format for presenting at least the first portion of the plurality of sensory datasets, and the instructions, when executed by the processing circuitry, are configured to cause the processing circuitry to determine the first data presentation format based on the first action and the preferred format.

* * * * *